Figure 11:
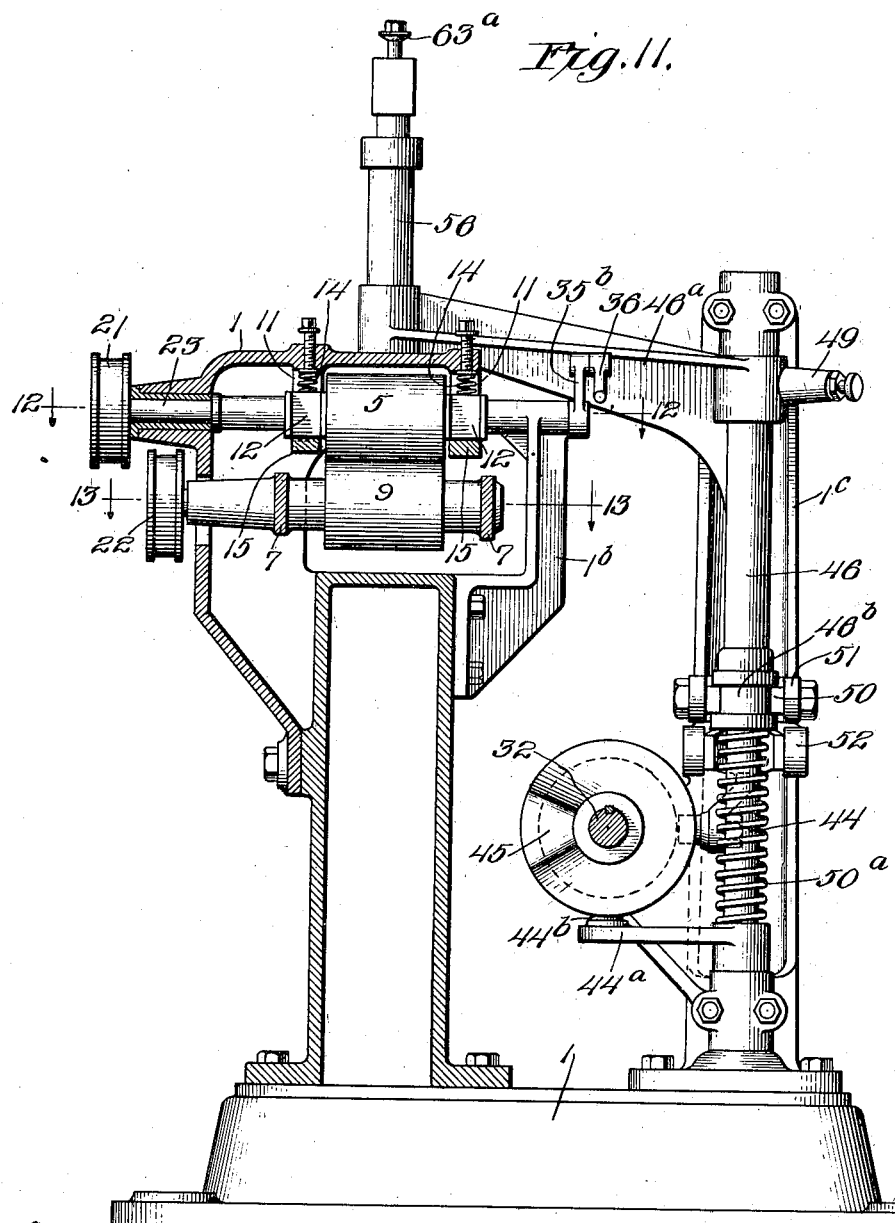

F. C. AREY.
APPARATUS FOR FEEDING METAL SHEETS OR STRIPS.
APPLICATION FILED APR. 15, 1912.
1,190,974.
Patented July 11, 1916.
15 SHEETS—SHEET 1.
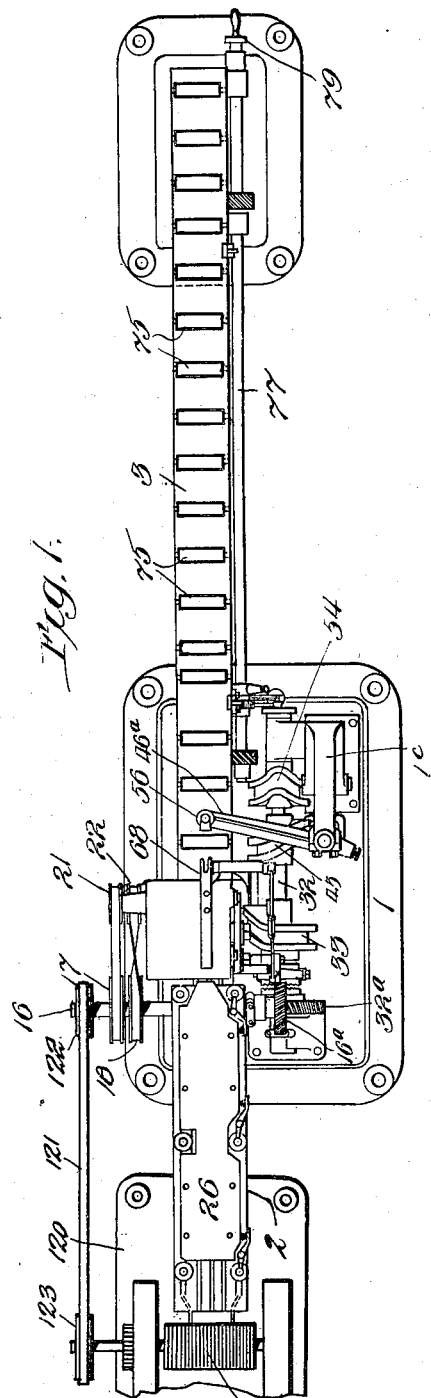
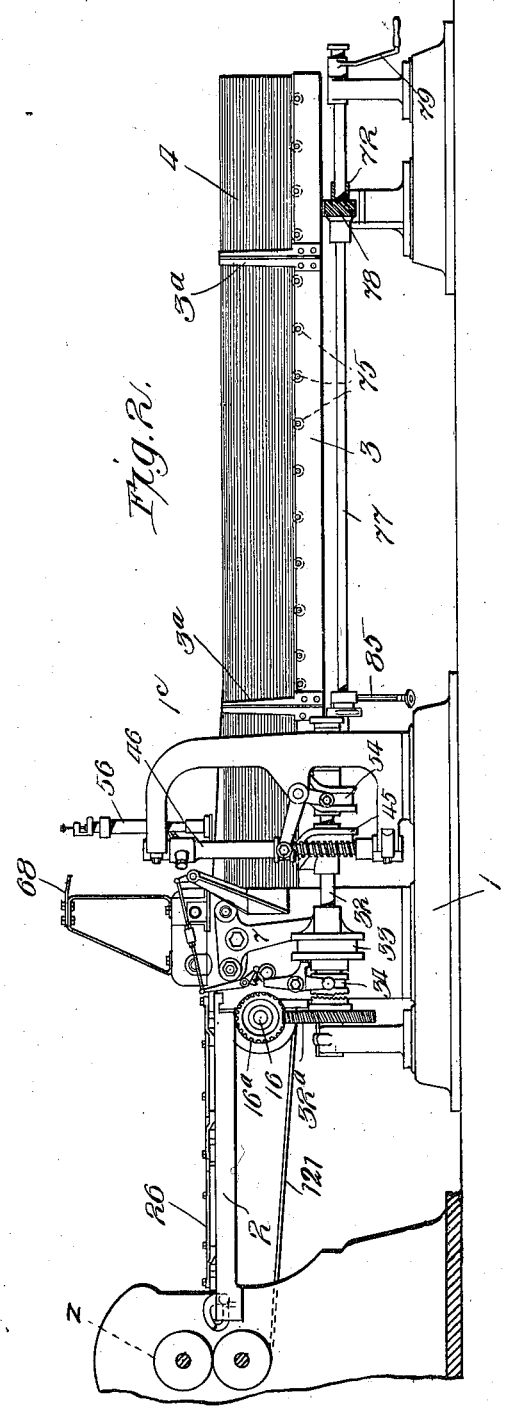
Inventor:
Fred C. Arey,
By Chamberlin Frendenreich
Attys

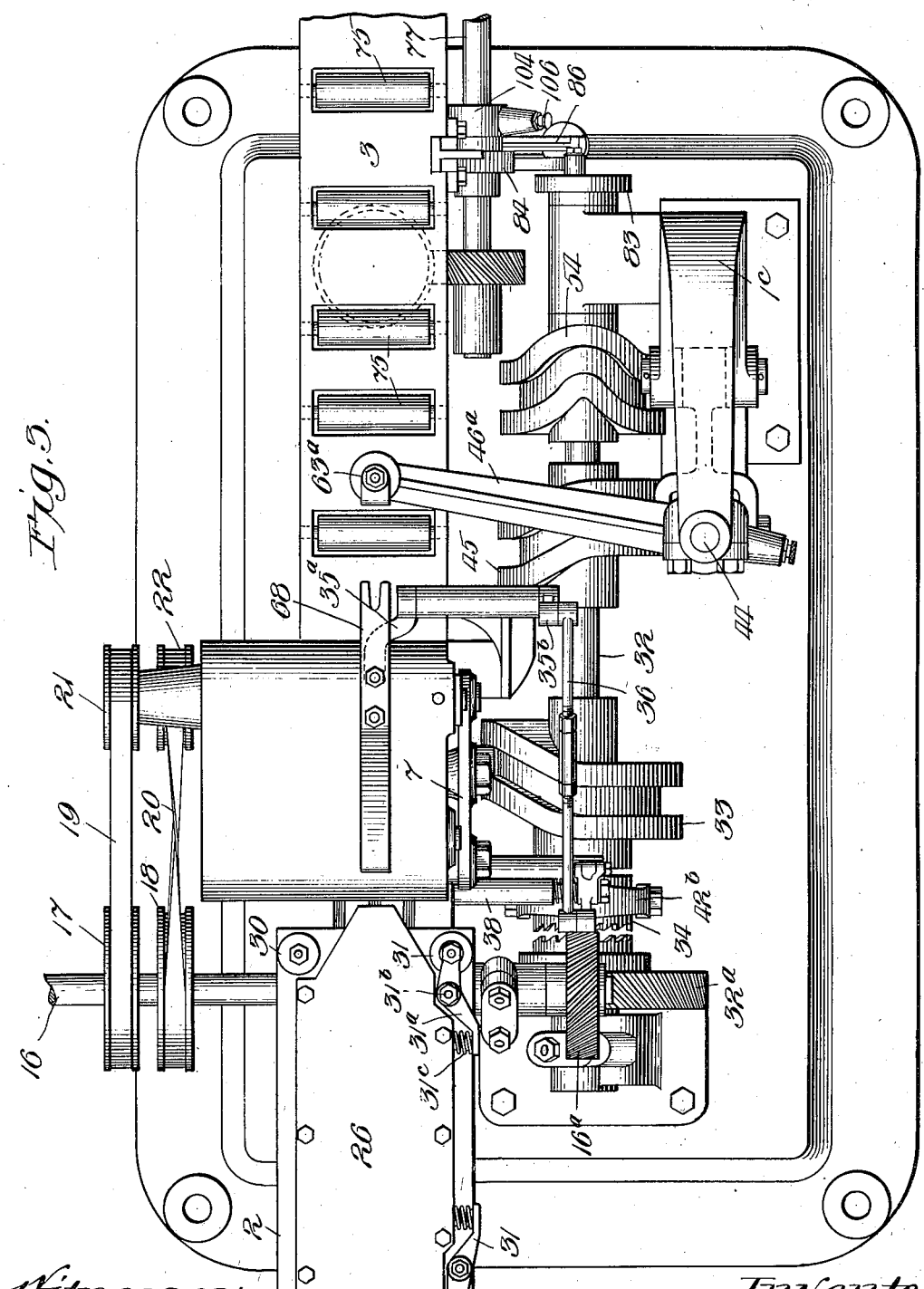

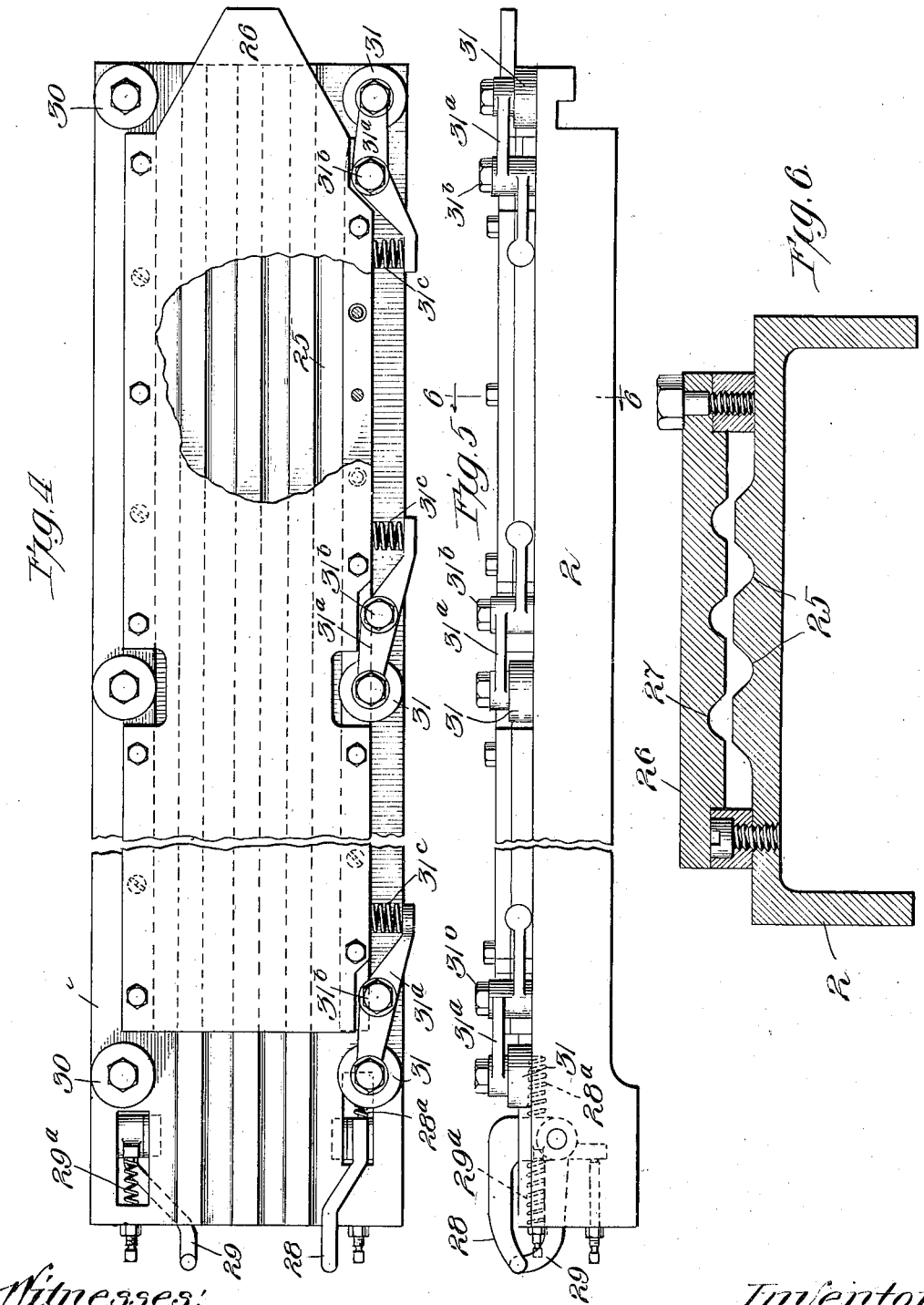

F. C. AREY.
APPARATUS FOR FEEDING METAL SHEETS OR STRIPS.
APPLICATION FILED APR. 15, 1912.
1,190,974.
Patented July 11, 1916.
15 SHEETS—SHEET 4.
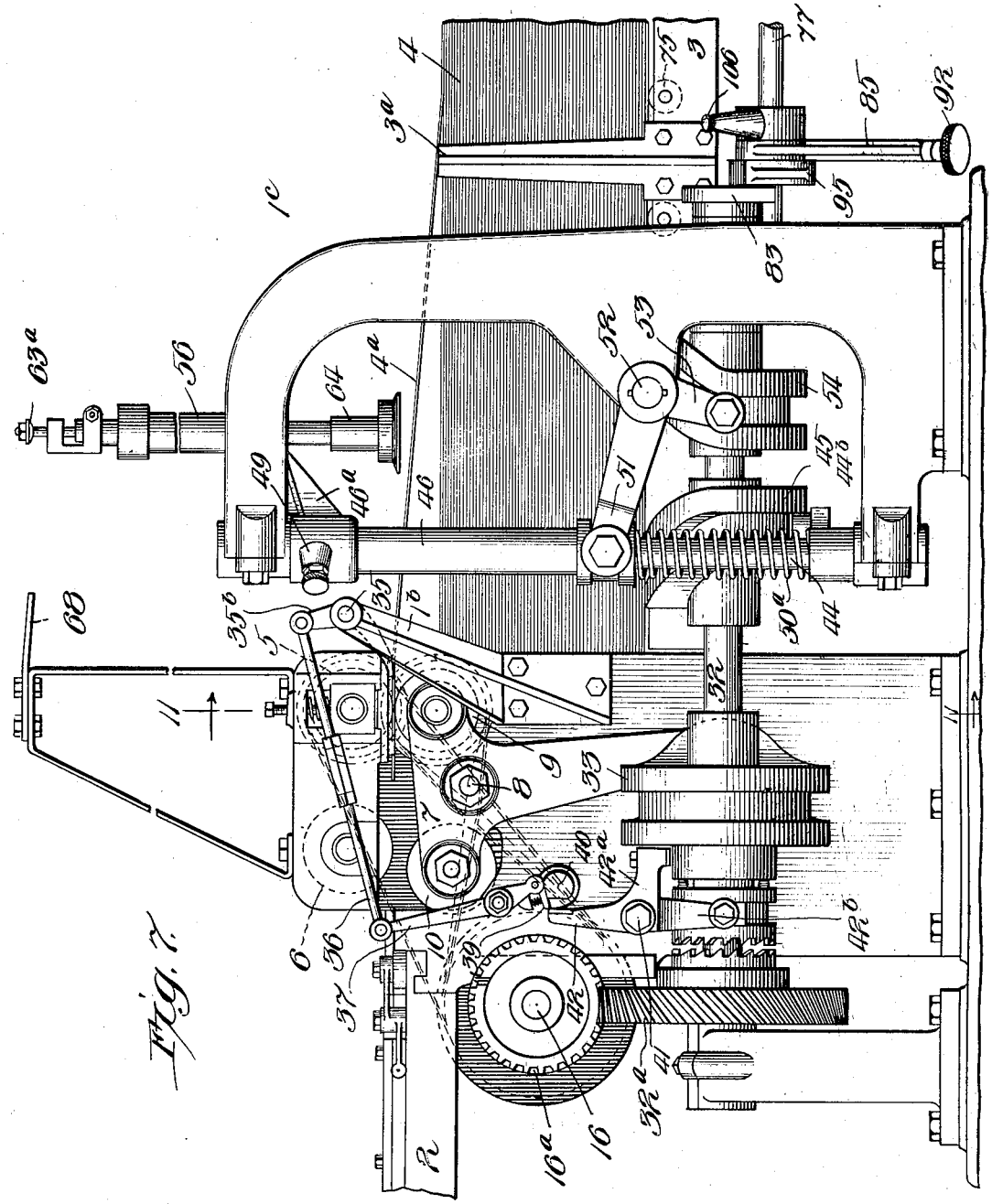

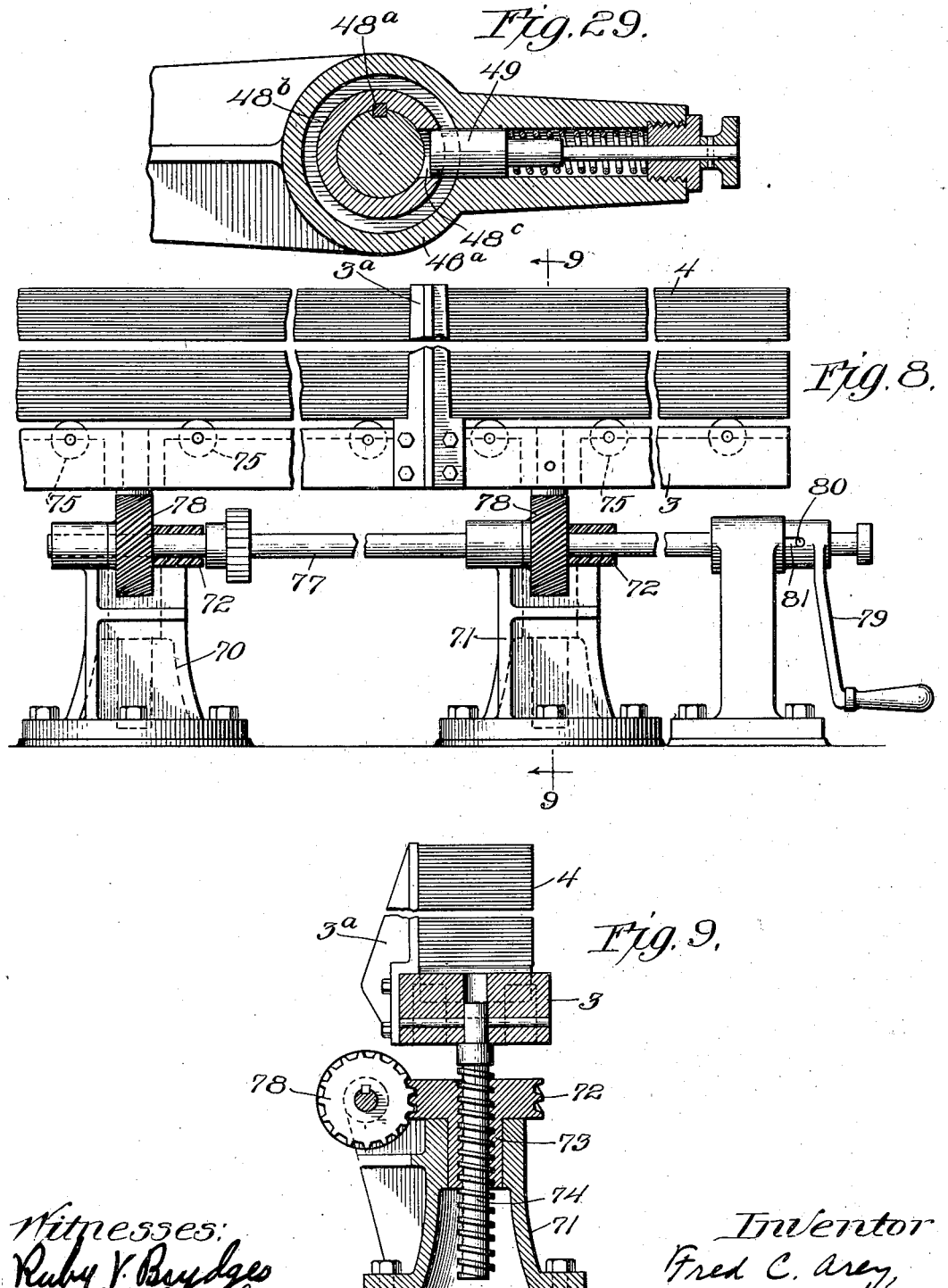

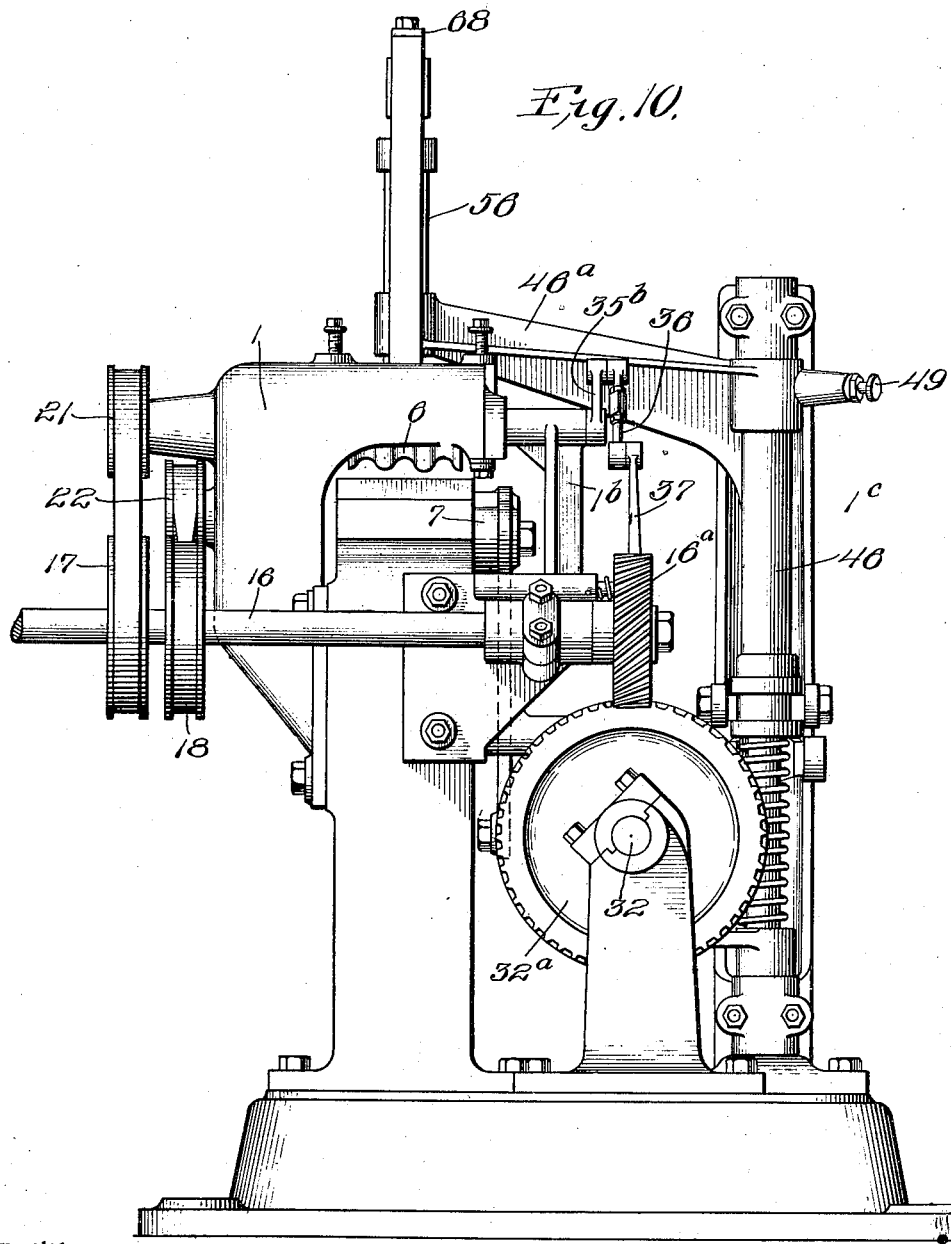

F. C. AREY.
APPARATUS FOR FEEDING METAL SHEETS OR STRIPS.
APPLICATION FILED APR. 15, 1912.

1,190,974.
Patented July 11, 1916.
15 SHEETS—SHEET 7.

F. C. AREY.
APPARATUS FOR FEEDING METAL SHEETS OR STRIPS.
APPLICATION FILED APR. 15, 1912.
1,190,974.
Patented July 11, 1916.
15 SHEETS—SHEET 8.
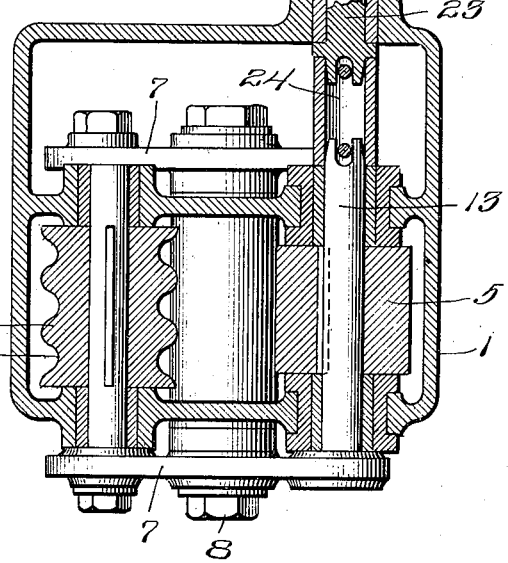
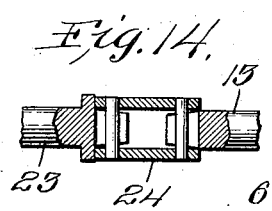
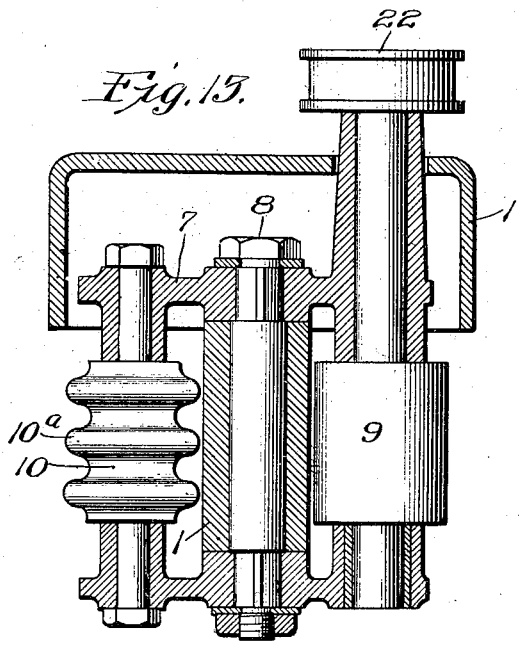

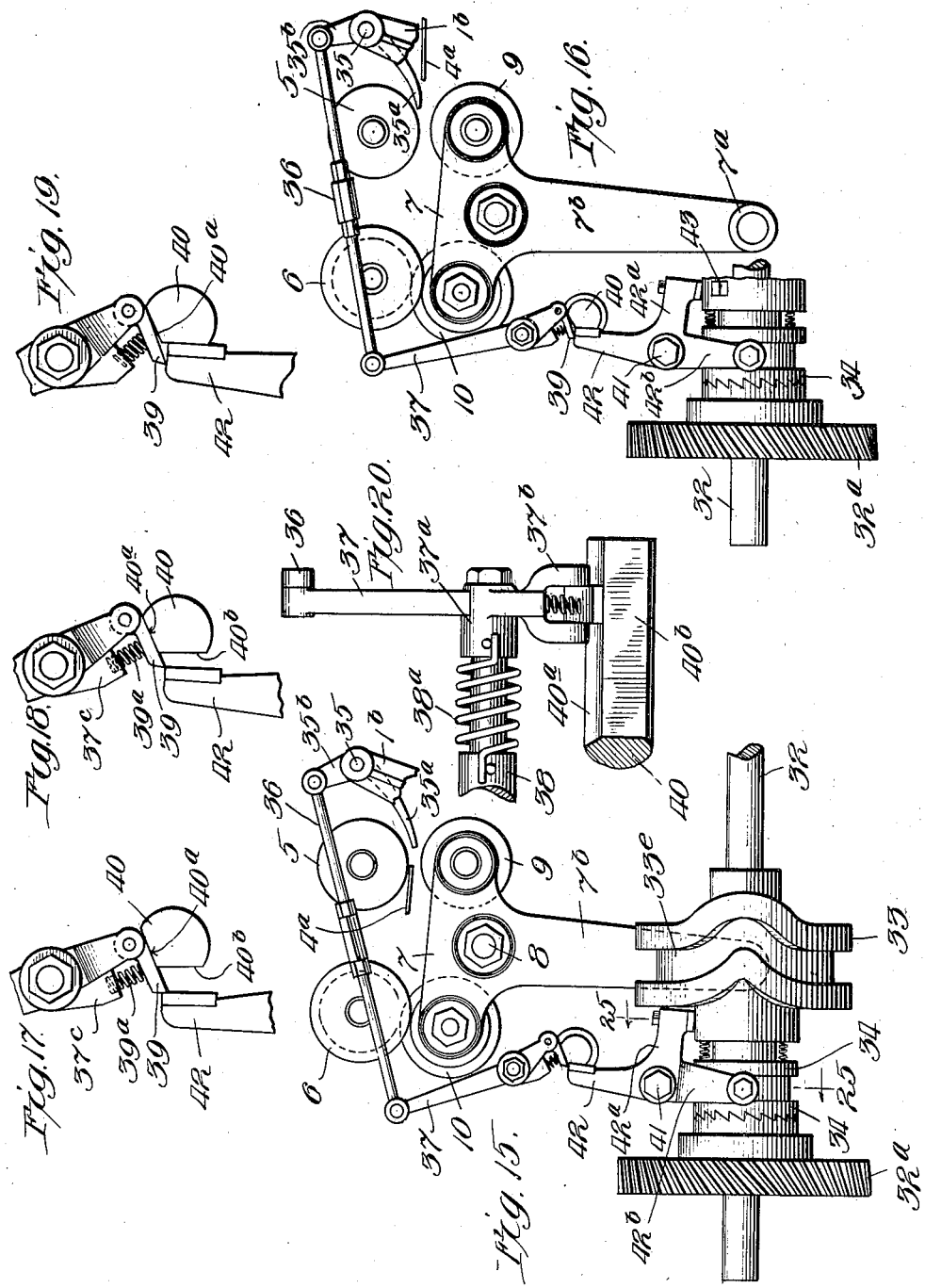

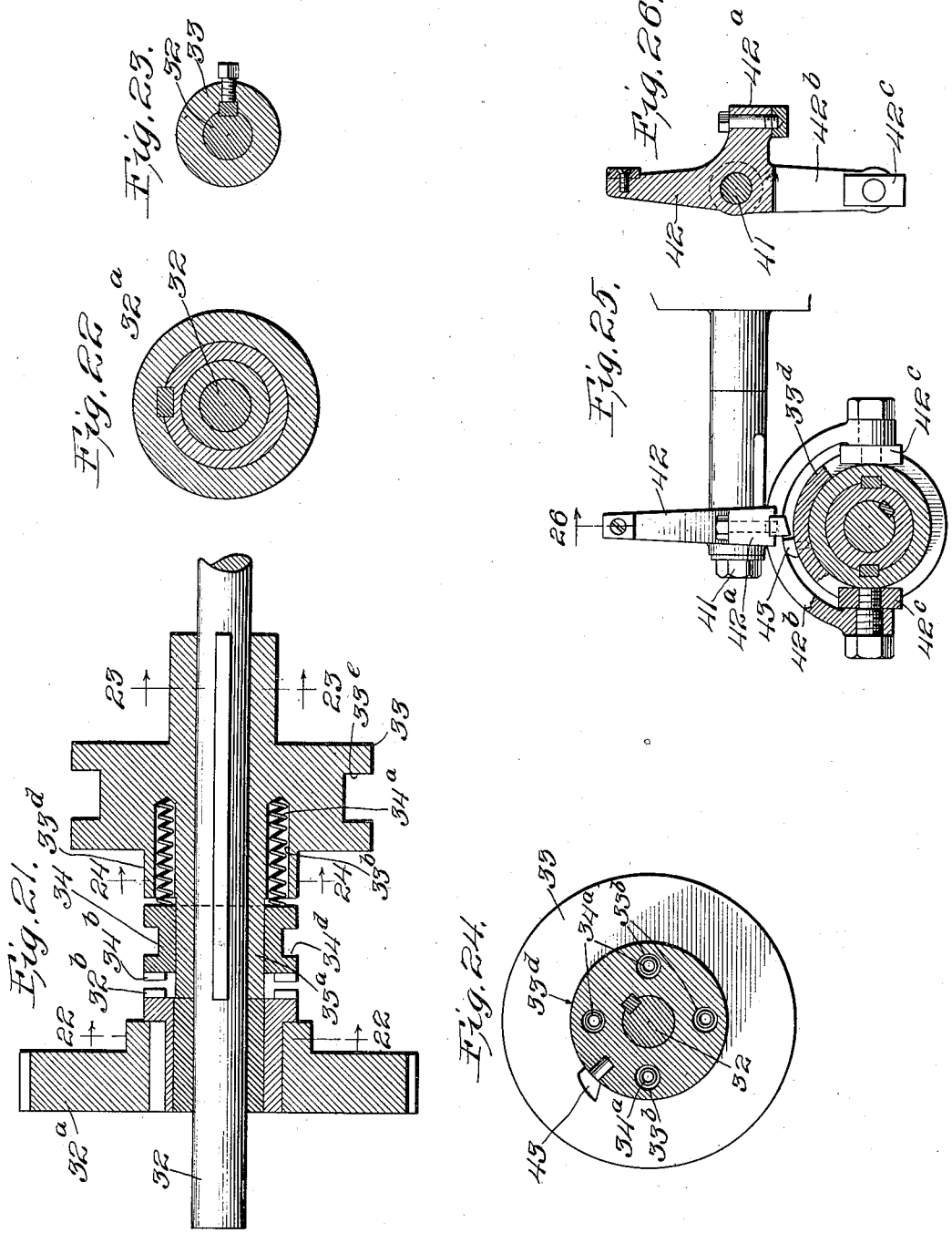

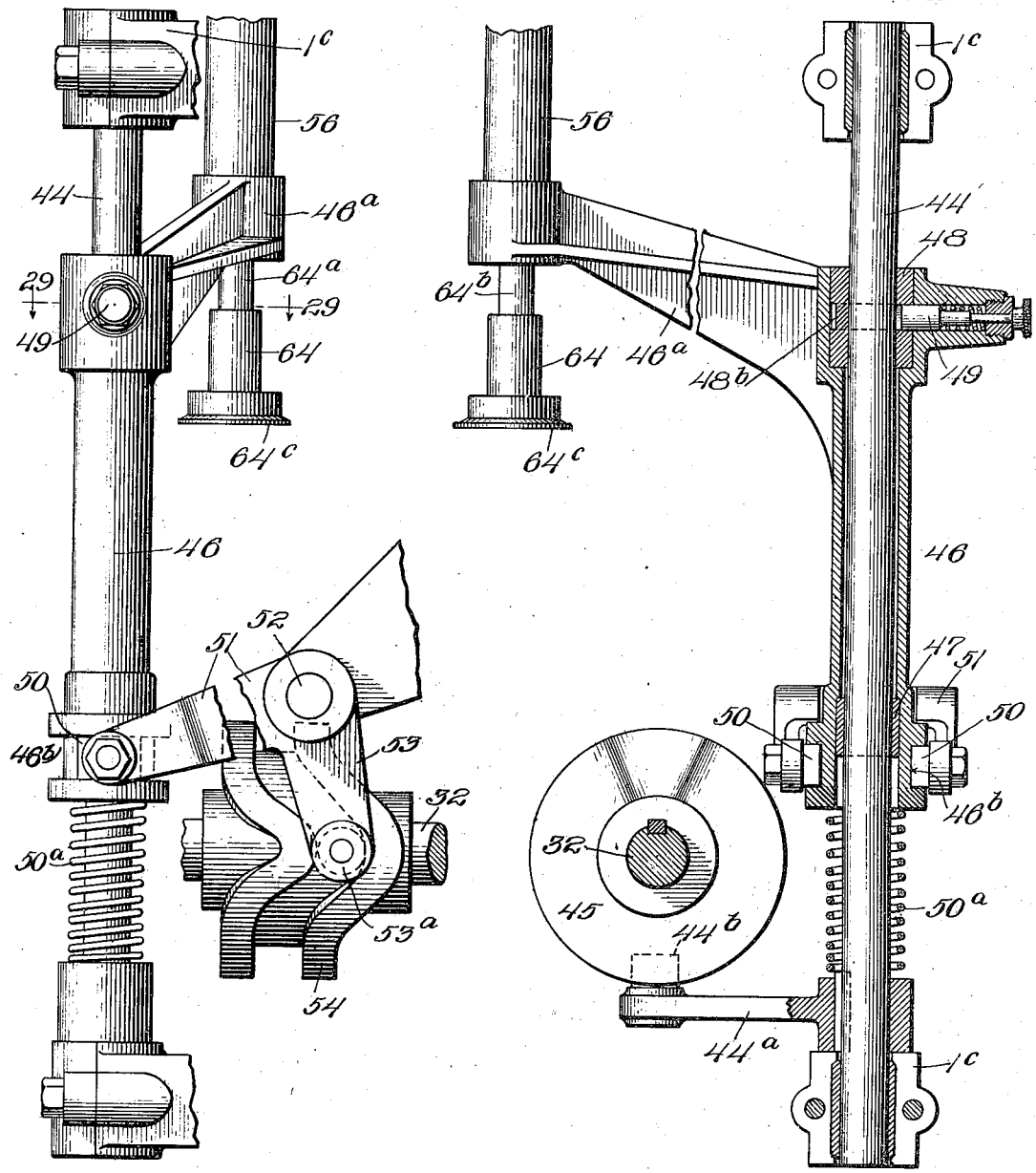

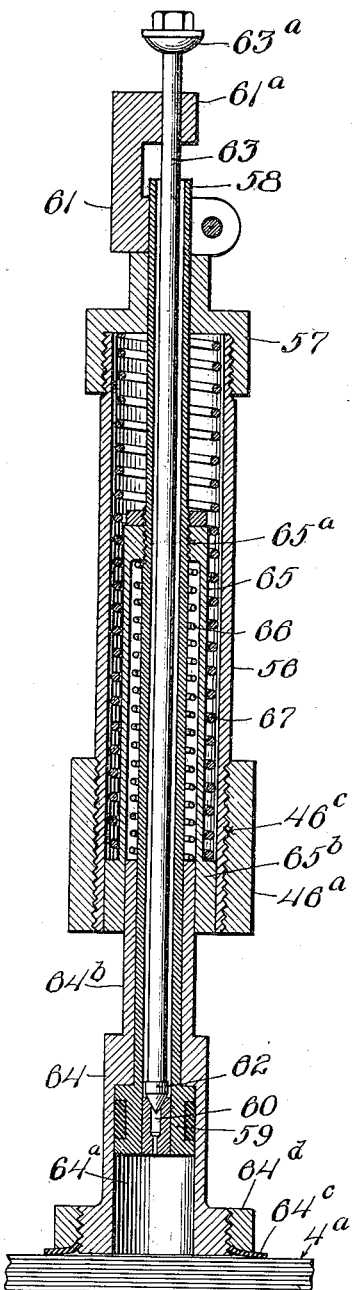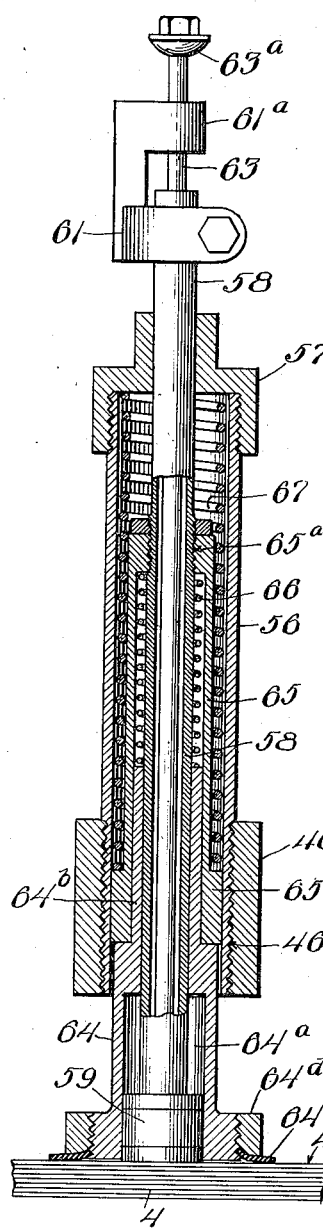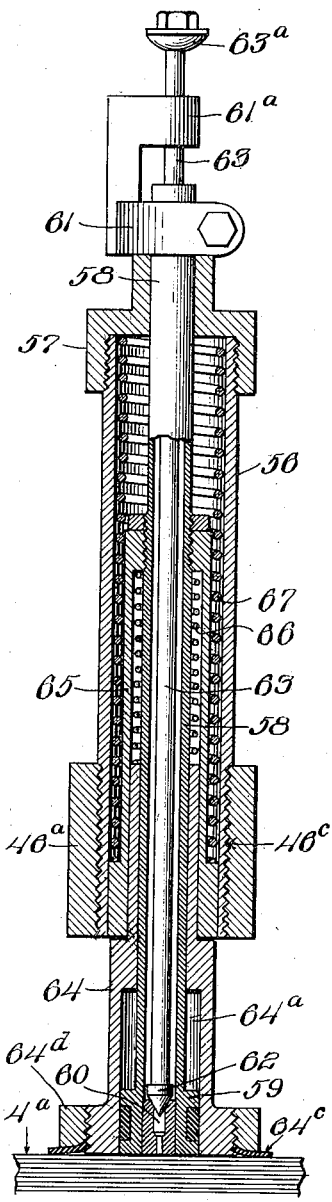

F. C. AREY.
APPARATUS FOR FEEDING METAL SHEETS OR STRIPS.
APPLICATION FILED APR. 15, 1912.
1,190,974.
Patented July 11, 1916.
15 SHEETS—SHEET 13.
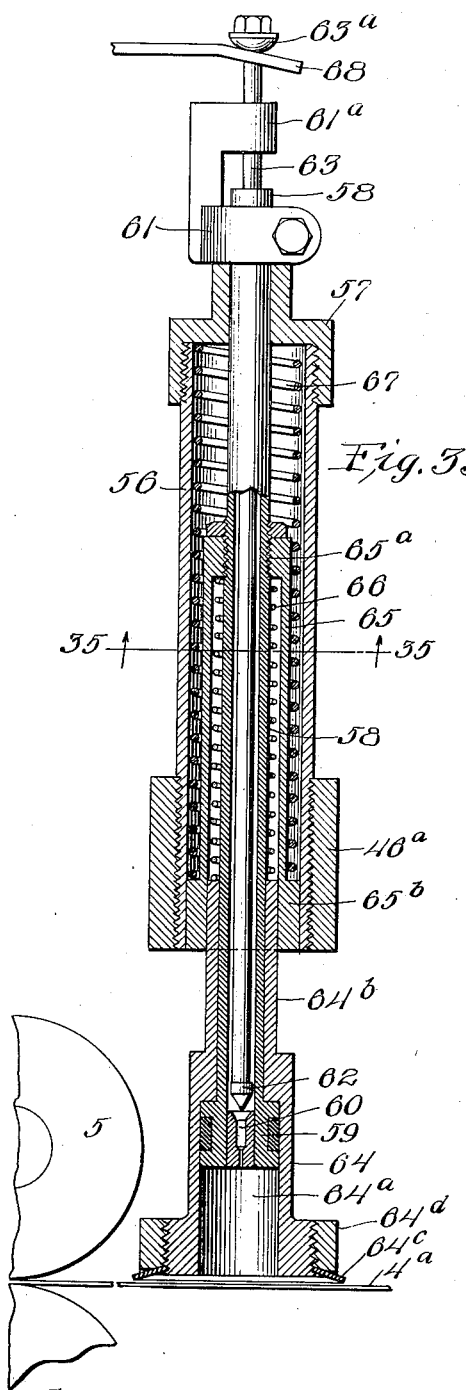
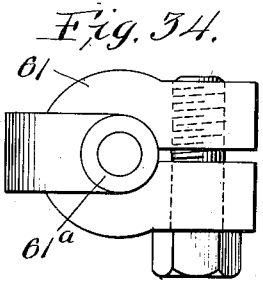
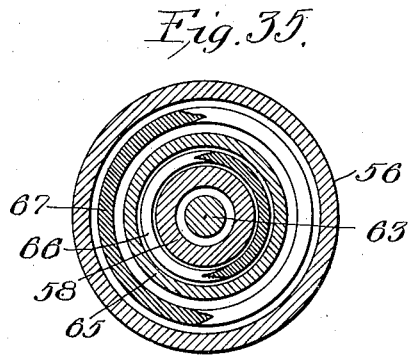
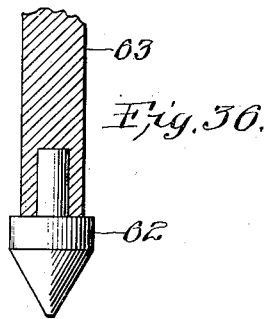
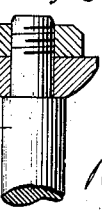

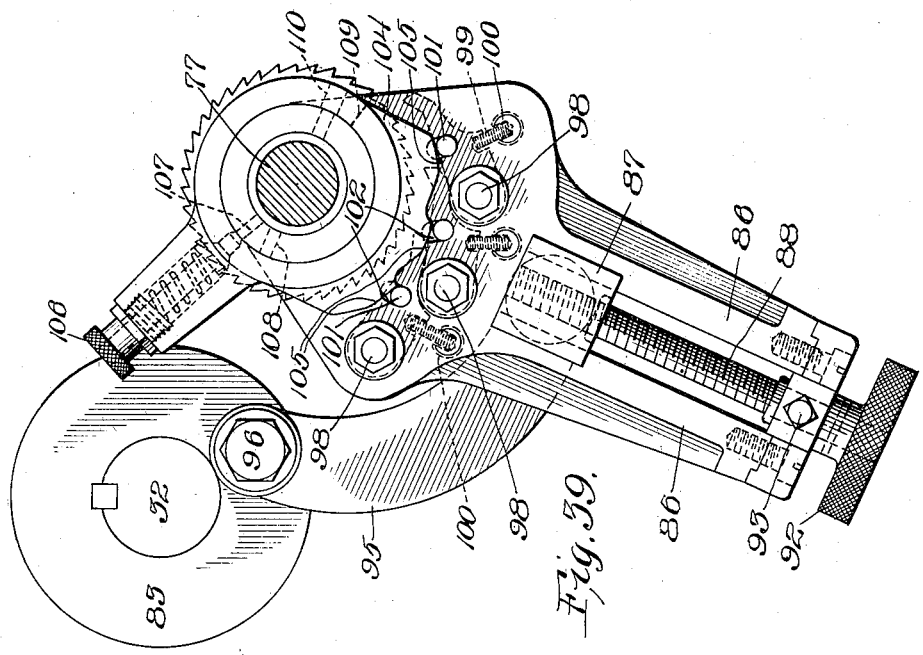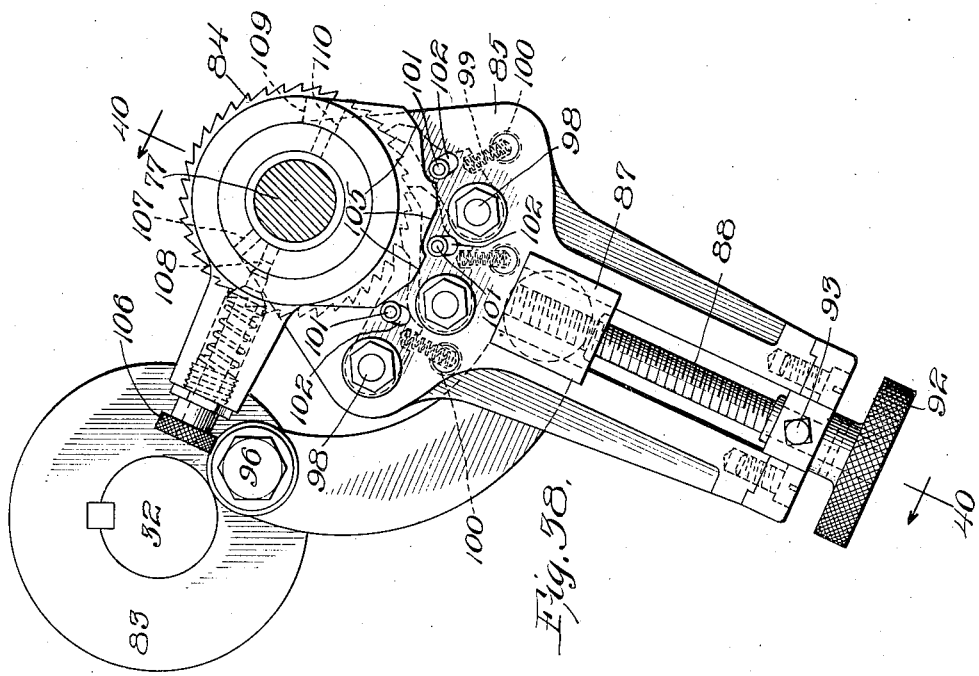

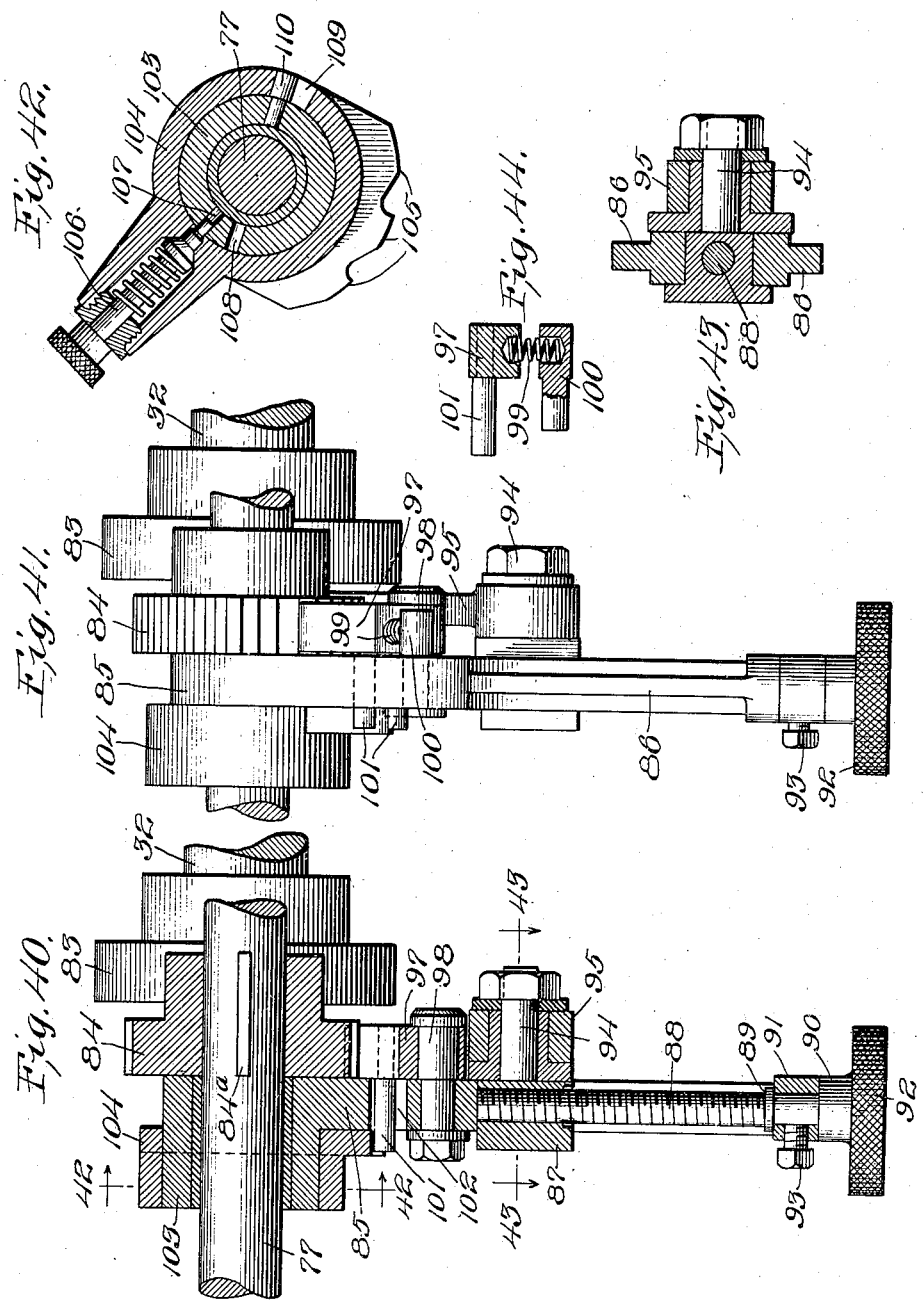

UNITED STATES PATENT OFFICE.

FRED C. AREY, OF OAK PARK, ILLINOIS, ASSIGNOR TO NORTHWESTERN EXPANDED METAL COMPANY, OF CHICAGO, ILLINOIS, A CORPORATION OF ILLINOIS.

APPARATUS FOR FEEDING METAL SHEETS OR STRIPS.

1,190,974.      Specification of Letters Patent.      Patented July 11, 1916.

Application filed April 15, 1912. Serial No. 690,895.

*To all whom it may concern:*

Be it known that I, FRED C. AREY, a citizen of the United States, residing at Oak Park, county of Cook, State of Illinois, have invented a certain new and useful Improvement in Apparatus for Feeding Metal Sheets or Strips, and declare the following to be a full, clear, and exact description of the same, such as will enable others skilled in the art to which it pertains to make and use the same, reference being had to the accompanying drawings, which form a part of this specification.

My invention has for its main object to produce a reliable mechanism for feeding sheets or strips of sheet metal to a machine which is to operate upon the same.

A subsidiary object of my invention is to provide means in a feeding mechanism for preventing one sheet or strip from overlapping the rear end of the one preceding it.

A further subsidiary object of my invention is to provide a novel and efficient arrangement for picking up one end of a strip or sheet from a pile and delivering it to suitable feed rolls or the like.

A further object of my invention is to produce a novel feeding mechanism including a construction and arrangement for supporting a pile of superposed sheets or strips and automatically maintaining the top of the pile at a predetermined level as the height of the pile diminishes.

The various features of novelty whereby my invention is characterized will hereinafter be pointed out with particularity in the claims; but, for a full understanding of my invention and of its various objects, including those enumerated and minor ones to be hereinafter made clear, reference is to be had to the following detailed description taken in connection with the accompanying drawings, wherein:

Figure 1 is a plan view of a feeding mechanism embodying the various features of my invention in preferred forms; Fig. 2 is a side elevation of the mechanism shown in Fig. 1, there being indicated in dotted lines a portion of a machine to which sheets or strips are to be fed; Fig. 3 is a plan view on an enlarged scale of the central portion of the mechanism shown in Fig. 1; Fig. 4 is a plan view on an enlarged scale of the table or guide at the left hand of Fig. 1; Fig. 5 is a side view of the parts shown in Fig. 4; Fig. 6 is a section on line 6—6 of Fig. 5; Fig. 7 is a side elevation of the parts shown in Fig. 3; Fig. 8 is a side elevation on an enlarged scale of the right hand end of the machine as viewed in Figs. 1 and 2, parts being broken away in order to reduce the size of the figure; Fig. 9 is a section on line 9—9 of Fig. 8; Fig. 10 is a view looking toward the right in Fig. 7, the receiving table or guide being omitted; Fig. 11 is a section taken approximately on line 11 of Fig. 7; Fig. 12 is a section taken approximately on line 12—12 of Fig. 11; Fig. 13 is a section taken approximately on line 13—13 of Fig. 11; Fig. 14 is a detail of a portion of one of the driving shafts shown in Fig. 12; Fig. 15 is a side view of a portion of the machine, showing the mechanism controlled by a sheet or strip for setting in motion the mechanism which picks up a new sheet or strip; Fig. 16 is a view similar to Fig. 15, showing a different position of the parts; Figs. 17, 18 and 19 are detail views on an enlarged scale showing several different positions of the immediate tripping device for the controlling clutch; Fig. 20 is a side view looking toward the right in Fig. 17, the clutch-controlling arm being omitted; Fig. 21 is a vertical section through the main clutch and the adjacent parts on the main shaft; Fig. 22 is a section on line 22—22 of Fig. 21; Fig. 23 is a section on line 23—23 of Fig. 21; Fig. 24 is a section on line 24—24 of Fig. 21; Fig. 25 is a transverse section through the shiftable member of the clutch with the operating lever in position thereon, the section being taken approximately on line 25—25 of Fig. 15; Fig. 26 is a section through the controlling lever on the line marked 26 in Fig. 25; Fig. 27 is a fragment on an enlarged scale illustrating a portion of the mechanism for lifting a sheet or strip and one of the cams for operating the same; Fig. 28 is a view partly in side elevation, looking toward the right in Fig. 27, and partly in vertical section, illustrating the second controlling cam; Fig. 29 is a section on an enlarged scale approximately on line 29—29 of Fig. 27; Figs. 30, 31 and 32 are vertical sections on an enlarged scale through the pneumatic lifting device, different positions of the parts being illustrated in the several figures; Fig. 33 is a view similar to Fig. 30, illustrating also the controlling device for the valve in the pneumatic device and the relation of the lifting device to the feed rolls at the time of the opening of the valve; Fig. 34 is a plan view on an enlarged scale of the guide for the upper end of the valve rod; Fig. 35 is a section on line 35—35 of Fig. 33; Fig. 36 is a section through the lower end of the valve rod or stem; Fig. 37 is a detail illustrating the button or head at the upper end of the valve rod or stem; Figs. 38 and 39 are side views, on an enlarged scale of the ratchet mechanism by which the pile of strips or sheets is raised step by step as sheets are removed from the top of the pile, the parts being shown in different positions in the two views; Fig. 40 is a section approximately on line 40—40 of Fig. 38; Fig. 41 is an elevation looking toward the left in Fig. 38; Fig. 42 is a section on line 42—42 of Fig. 40; Fig. 43 is a section approximately on line 43—43 of Fig. 40; and Fig. 44 is a section through one of the pawls and the support for its controlling spring.

My invention is particularly adapted for use in connection with high speed metalworking machines in which a strip or long sheet of metal is operated upon to change its characteristics; for example, a metal lath machine and, for the sake of brevity, I have illustrated and shall describe only a single machine or group of mechanisms in which all of the desirable features adapting it for use in connection with a machine of the kind to which I have just referred are combined together; the machine illustrated being one particularly adapted for feeding long sheet metal strips to a high speed metal lath machine. It will of course be understood, however, that my invention is not limited in its use to feeding stock to metal lath machines, nor is it limited to a mechanism or group of mechanisms in which all of the various novel features which I have devised are brought together to make a single whole.

In Figs. 1 and 2 of the drawings I have illustrated a portion of a well known form of metal lath machine having slitting rolls Z by means of which a series of rows of slits are cut into a long strip of sheet metal, after which the sheet is stretched or expanded. The machine which I have devised is adapted to pick up strips automatically from a suitable pile or stack of the same and to feed them into the machine in which they are to be operated upon at such a rate that there will be no gap between the adjacent ends of the strips, but the effect will be rather that of one continuous strip; thereby securing the fullest efficiency of operation by avoiding idle points as is the case where a gap is left between the rear end of one strip and the front end of the following strip.

Referring to the drawings, 1 represents a suitable stationary frame having on one end thereof a table or guide 2 adapted to extend in proximity to the point at which the strips are to be introduced into the machine for working them, that is in proximity to the slitting rolls in a metal lath machine. On the opposite end of the frame 1 is a platform or table 3 upon which a stack 4 of sheets is adapted to be placed. On the frame are supported two horizontal rolls 5 and 6 lying one behind the other with their lowermost points approximately in the plane of the top of the member 2. Below the rolls 5 and 6, (see particularly Figs. 7 and 11 to 13) is a frame 7 mounted between its ends upon a horizontal shaft 8 which is revolubly supported by a portion of the main frame. The shaft 8 is located between the axes of the rolls 5 and 6 so that as the frame 7 is swung in one direction one end approaches the roll 5 and the other recedes from the roll 6 while, upon swinging the frame in the opposite direction, the latter end thereof approaches the roll 6 and the other end moves away from roll 5. On the end of the swinging frame below the roll 5 is a roll 9 so positioned that when the frame is swung to carry it into engagement with the roll 5, the axis of the roll 9 is directly beneath the axis of the roll 5. On the other end of the swinging frame is a roll 10 adapted, in one position of the swinging frame, to coöperate with the roll 6. The rolls 5 and 9 are plain cylindrical rolls whose length is approximately equal to the width of the strip to be fed. The rolls 6 and 10 are provided with circumferential ribs $6^a$ and $10^a$, respectively, these ribs being so arranged that each rib on one roll lies between two of the ribs on the other roll when the swinging frame is moved to bring the roll 10 into operative relation to the roll 6. The roll 5 is preferably mounted in vertically yieldable bearings so that it will exert a yielding downward pressure upon a strip passing between it and the roll 9. In the arrangement shown, the main frame is provided with two vertical jaws 11 in which are slidably mounted journal boxes 12 into which extend the ends of the shaft 13 of the roll 5. In the jaws above the journal boxes are springs 14 which yieldingly press the boxes, and the roll carried thereby, in a downward direction. The jaws may be closed at the bottom by detachable plates 15, thus forming a stop to limit the downward movement of the roll.

On one end of the main frame is mounted a transverse shaft 16 continuously driven in any suitable manner, and on this shaft, (see Fig. 3) are pulleys 17 and 18, respectively, from which extend belts 19 and 20, one of which passes over a pulley 21 on the end of the shaft of the roll 5 and the other of which passes over a pulley 22 on the supporting shaft for the roll 9. The pulley 22 moves with the swinging frame, but I prefer to mount the pulley 21, or rather the supporting shaft 23 for this pulley, directly on the main frame and therefore I introduce between the shaft 23 and the roller shaft 13 a suitable universal joint 24 which will permit the roll 5 to rise and fall without interfering with its driving connection with the pulley 21. The rolls 6 and 10 are idle rolls.

The swinging frame is automatically actuated from one position to another so that a strip entering between the rolls 5 and 9 is fed forward until its rear end is just about to pass between these rolls, whereupon the swinging frame is reversed so as to cause the corrugated roll 10 to rise and press the rear end of the strip against the coöperating corrugated roll. The strips, one of which is denoted by the reference character 4ª, are longer than the distance between the slitting roll Z and the roll 5 so that before the rear end of the strip is released by the feeding rolls, the front end is grasped by the slitting rolls and it is drawn through the latch machine. Consequently, when the rolls 6 and 10 engage with the strip, the strip acts as a driving member and causes them to rotate.

In operation I cause the rolls 5 and 9 to feed the strip somewhat faster than it passes through the slitting rolls, the yieldable supports for the roll 5 permitting it to slip readily on the strip as soon as it is engaged by the slitting rolls. By this means, the presence of a new strip at the slitting rolls just as soon as the rear end of the preceding strip has passed through them is insured. It is practically impossible to proportion the parts so delicately that each strip will just catch the preceding strip at the slitting rolls and therefore, in order to avoid the necessity of feeding the strips so slowly that they will be sure not to override the rear ends of the strips in advance, and thus cause a double thickness of metal to pass between the slitting rolls, I have provided the corrugated rolls which I have heretofore described. The corrugated rolls, it will be seen, will produce longitudinal corrugations in a short portion of the rear end of each strip as it is drawn between them by the slitting rolls and will thus make each strip present a vertical face of considerable height at the rear end. Consequently, when the following strip catches up, it will not overlap but will strike against the high vertical face in front of it and be forced to travel at the same speed as the strip in advance. I have elaborated this feature of my invention by providing the upper face of the guide or table 2 with longitudinal corrugations 25 adapted to fit the corrugations in the rear ends of the strips. Secured above the table or guide is a cover 26 having its under face corrugated as at 27 so that the grooves in the member 27 lie opposite the raised portions in the top of the table, there being just enough room left between the high points on the table and the low points on the cover to permit the passage of the flat portion of a strip, the corrugated portions being accommodated by the corrugations in the table and in the cover. By this arrangement, it is impossible for the front end of a strip to slide beneath or to rise above the rear end of the strip in advance. When the corrugated rear end of a strip passes between the slitting rolls it is of course flattened out again. It might possibly happen that the following strip, which tends to move forward faster than the one between the slitting rolls, would override the latter just as the slitting rolls are reached and thus produce a slightly overlapping of the two strips. To prevent any possibility of such an occurrence, I have provided means, on the end of the table or guide adjacent to the slitting rolls, for slightly tilting the front end of each strip as it nears the slitting rolls. To this end I have provided on the front end of the table or supporting guide two dogs 28 and 29, the former lying above the table and acting to press one side of a strip down while the other dog lies below the table and serves to press the opposite side of the strip up. Thus as the front end of the strip passes beyond the end of the table it is canted so as to lie at an angle to the rear end of the strip in advance. Consequently a strip cannot pass the rear end of another strip which precedes it. The canting of the strips is not sufficient to prevent them from feeding readily between the slitting rolls. The dogs 28 and 29 may be constructed and supported in any suitable manner. In the arrangement shown, each dog is pivotally connected at one end to the table and has its free end projecting beyond the end of the table. Springs 28ª and 29ª are adapted to press the dogs in the direction to tilt or cant the strips; being strong enough to effect the tilting or canting, but not so strong as to place any appreciable strain on the strip when it is grasped by the slitting rolls and returned to its horizontal position.

At one side of the table, and projecting slightly into the space between the cover and the table are a series of idle rollers 30 against which one edge of each strip bears. On the opposite side of the table, and preferably opposite the rollers 30 is a similar series of rollers 31 yieldingly supported so that they may move in and out. In the arrangement shown each of the rollers 31 is mounted upon one end of a member 31ª which is pivotally supported between its ends on the table as at 31ᵇ and has a spring 31ᶜ acting on its other end and tending to press the roller into the space or chamber between the table and the cover. With this arrangement each strip will be positively positioned in the lateral direction without imposing any resistance to its travel, for the rollers at the sides serve as anti-friction bearings. By making one set of rollers yieldable, compensation is afforded for slight variations in widths of the strips, so that all of the strips will be positively guided and alined even though they vary slightly in width.

As I have heretofore explained, the swinging frame and the mechanism for delivering the strips to the main feed rolls 5 and 9 is controlled directly by the strips passing between the feed rolls so that as soon as the rear end of a strip reaches the main feed rolls, another strip will be picked up so as to be ready to be delivered to the feed rolls. The power for operating the mechanisms for producing these operations is obtained from a counter-shaft 32 extending longitudinally of the machine at one side and having thereon a loose worm wheel $32^a$ which is driven by a worm $16^a$ on the main shaft. In other words, there is on the counter-shaft a loose gear member which is driven by a suitable coöperating gear member on the main shaft. On the counter-shaft is a suitable clutch by which the loose gear member may be locked to the shaft or left free to rotate thereon. The clutch construction is best shown in Figs. 7 and 15 and in the sectional view, Fig. 21. Referring to these figures, 33 is a cam, whose purpose will be hereinafter explained, fixed to the counter-shaft near the loose gear member $32^a$. The cam may conveniently be provided with an elongated hub $33^a$ which extends laterally therefrom and abuts against the near side of the gear member $32^a$. On this hub is splined a clutch member 34 which is free to slide longitudinally on the hub and is compelled to rotate therewith. On the gear member $32^a$ and on the clutch member 34 are coöperating clutch teeth $32^b$ and $34^b$, respectively. Springs $34^a$ contained within sockets $33^b$ in the side of the cam tend to force the member 34 toward the gear member so as to bring the clutch teeth into operative relation to each other and cause the counter shaft to be operated.

On an arm $1^b$ on the main frame is a transverse rock shaft 35 having a finger, $35^a$, which lies in front of and extends in proximity to the main feed roll 5. On the end of the rock shaft is an arm, $35^b$, which is connected, by means of a link 36, to the upper end of a long lever 37 which is in turn pivotally mounted on the main frame near its lower end. The means for mounting the lever 37 is best shown in Fig. 20, 38 representing a stub shaft projecting out from the main frame and extending through a hub $37^a$ near the lower end of the lever, the lever being loose on the shaft. A torsion spring $38^a$ arranged on the stub shaft, and engaging at its ends with the shaft and with the lever, tends to swing the lever in the clockwise direction as viewed in Figs. 15 and 16. In other words, the torsion spring tends to hold the lever 37 in such a position that the lower end of the finger $35^a$ is raised into the horizontal plane tangential to the bottom of the feed roll 5. The lower end of the lever 37 is forked as indicated at $37^b$ and in the fork is hung a finger 39. On the frame of the machine below the lever 37 is a projecting post 40 having an inclined upper edge $40^a$ and a flat front edge or face $40^b$, the post being so located as to engage with the finger on the lower end of the lever and limit its downward movement.

$39^a$ is a spring bearing at its ends against a shoulder $37^c$ on the lever 37 and against the upper side of the finger 39, respectively; the spring pressing the finger down against the inclined upper face of the post 40. The post 40 serves also as a stop for the clutch-operating lever which I shall now describe. On the frame of the machine just above the clutch member 34 is a horizontal stud 41 which extends out over the member 34, the stud extending at right angles to the counter-shaft. On the stud is mounted a three-armed lever, one arm 42 of which extends up in proximity to the post 40 and is adapted to engage with the vertical face $40^b$ at one limit of its movement. The second arm, $42^a$, extends laterally so as to overlie an enlarged portion $33^d$ of the hub on the cam 33. The third arm, $42^b$, is in the form of a fork or yoke and extends down over the upper half of the clutch member 34, being provided with bearing blocks $42^c$ which lie in an annular groove $34^d$ in the clutch member 34. On the hub portion $33^d$ is a cam-like lug or projection 43 which is adapted to engage with the arm $42^a$ of the clutch-actuating lever during each revolution of the cam.

The cam 33 is provided with a circumferential groove $33^c$ into which extends a cam roll $7^a$ carried upon the lower end of an arm $7^b$ projecting down radially from the swinging frame 7, the cam groove being so arranged that in a predetermined position of the cam the swinging frame is held so as to maintain the feed roll 9 in operative relation to the roll 5, while in other angular positions of the cam the swinging frame is held in its opposite position.

The operation of the mechanisms which I have just described will be best understood by reference to Fig. 7 and Figs. 15 to 20. It will be seen that while a strip $4^a$ is passing through the main feed rolls, the controlling finger $35^a$ is held raised by the strip in the position to which the torsion spring $38^a$ associated with the lever 37 tends to move it. The parts are so proportioned that during this time the finger 39 on the lower end of the lever 37 engages with the side of the arm 42 of the clutch-actuating lever and holds this lever in the position indicated in Fig. 7, the teeth of the clutch being out of engagement with each other and the counter-shaft being stationary. The arm 42 of the clutch lever stands away from the post 40, as best shown in Fig. 17, being held against the tension of the clutch-operating springs 34ª by means of the strip acting through the part 35ª and the parts connected therewith. As soon as the rear end of the strip reaches the main feed rolls, as indicated approximately in Fig. 15, there is no longer any support for the controlling member 35ª and therefore, the clutch-actuating springs 34ª being more powerful than the torsion spring 38ª on the lever 37, the clutch member 34 begins to move toward its coöperating clutch member, swinging the clutch-actuating lever in the clockwise direction and, through the finger 39, oscillating the lever 37. The parts are so proportioned that before the upper end of the lever arm 42 strikes against the post or stop 40 it drops below the lower edge of the finger 39. This movement is brought about by means of the inclined upper face 40ª on the post which causes the free end of the finger 39, namely that which engages with the lever arm 42, to rise as the lever 37 is oscillated by the clutch lever. Fig. 18 illustrates the condition of the parts when the upper end of the lever arm 42 is just about to drop below the free end of the finger and, as the member 42 approaches closer to the post, it releases the finger so that the torsion spring 38ª is free to return the lever 37 to its normal position, the finger 39 riding forward over the top of the lever arm 42 as indicated in Fig. 19 and also in Fig. 16, thus bringing the controlling finger 35ª back to its normal position in the plane of the top of the strip passing through the main feed rolls. As soon as the clutch is thrown in, the counter-shaft and the cam 33 begin to rotate and the swinging frame is shifted from the position indicated in Fig. 7 to that indicated in Fig. 15, the rolls 5 and 9 being drawn apart and the rolls 6 and 10 pressed together upon the rear end of the strip which has just left the main feed rolls. The swinging frame is left in the position indicated in Fig. 15 during the time it takes the cam to make one revolution and then, as the cam roll on the swinging frame reaches the high point on the cam, the swinging frame is returned to the position indicated in Fig. 7. It will thus be seen that the main feed rolls are left open during the greater part of one revolution of the counter-shaft and cam, allowing time for a new strip to be inserted between them before they are again closed. When the cam 33 has made almost a complete revolution, the lug 43 engages with the arm 42ª of the clutch lever and oscillates the clutch lever so as to throw the clutch out of action, the parts being so proportioned that the lever is returned to the position indicated in Fig. 7. It will be seen that when the clutch lever returns to its idle position it permits the finger 39 to drop down behind it as indicated in Figs. 7 and 17, thus locking the clutch lever in its idle position as long as the lever 37, which carries the finger 39, is held against oscillation. If no strip has been placed between the main feed rolls, then there will be nothing to prevent the clutch-actuating springs from again overcoming the holding spring for the lever 37 as soon as the clutch is thrown out of action; but, by inserting a strip between the main feed rolls while they are open, the controlling member 35ª will be supported by this strip at the time the clutch is thrown out and the clutch will therefore be locked in its inoperative position until the new strip has passed through the feed rolls so that the controlling member 35ª is permitted to drop down from the rear end of the strip as indicated in Fig. 15.

I have provided means for automatically picking up a strip from the top of the pile 4 and delivering it between the main feed rolls during the time the rolls are open, thus permitting the feed rolls to begin their feeding operation immediately upon being brought in operative relation to each other and occasioning no delay. Generally speaking, this mechanism comprises a pneumatic pick-up device which is lowered upon the top of the pile, raised to lift the top strip and then moved forwardly so as to bring the end of the strip between the feed rolls. On the main frame of the machine behind the feed rolls and outside of the counter-shaft is an auxiliary frame 1ᶜ in which is revolubly mounted a vertical shaft 44. On the lower end of the shaft is secured a radial arm 44ª having on its free end a cam roll 44ᵇ which engages with a cam 45 fixed to the counter-shaft. The cam 45 is so arranged that during a portion of a revolution it permits the shaft to remain stationary while during another portion of its movement it turns the shaft through a predetermined angle and back again to the starting point. On the shaft is an elongated sleeve 46 having at its upper end a laterally extending arm 46ª which carries at its outer end the pneumatic pick-up device which I shall hereafter describe. The sleeve is suitably mounted so as normally to be free to move vertically on the shaft but held against angular movements relative to the shaft. The interior of the sleeve is preferably larger in diameter than the shaft so as to afford a clearance throughout the larger portion of the length of the sleeve, there being in the lower end of the sleeve a suitable bearing 47 which fits upon the shaft. In the upper end of the sleeve is a bearing member 48 splined to the shaft as indicated at 48ª, (see Fig. 29) so as to be slidable vertically upon the shaft and locked against rotation thereon. The bearing member 48 is provided with a short annular circumferential groove 48ᵇ between its ends and with a radially extending hole 48ᶜ in the bottom of the groove. On the sleeve is a spring-pressed plunger 49 which enters the hole 48ᶜ and locks the sleeve to the bearing member 48. By drawing out the plunger 49, the sleeve may be turned upon the shaft, thus permitting the pneumatic device to be swung laterally out of the way when the machine is standing idle. Surrounding the shaft beneath the sleeve is a coiled spring 50ª upon which the sleeve is adapted to rest and which tends to hold the sleeve elevated. The sleeve has a circumferential annular groove 46ᵇ in its lower end and into this groove extend shoes or blocks 50 carried upon the ends of a fork 51 which partially embraces the sleeve. The fork 51 forms one arm of a bell-crank lever pivotally supported upon the auxiliary frame 1ᶜ as at 52 so as to be capable of swinging about a horizontal axis, and having its other arm 53 extending down in proximity to a cam 54 fixed to the counter-shaft. On the free end of the arm 53 is a cam roll 53ª which engages with the cam 54. The cam 54 is so constructed that during each revolution of the counter-shaft it oscillates the bell-crank lever through a predetermined angle and back again; thus, through the connection between the bell-crank lever and the sleeve 46, causing the sleeve to be lowered and again raised once during each revolution of the counter-shaft. The cams 45 and 54 are so disposed relative to each other that the shaft 44 remains stationary while the sleeve is being lowered and then, as the sleeve begins to rise, the shaft begins to turn so as to carry the pneumatic device mounted on the sleeve in the direction of the feed rolls, the shaft being then turned back in the opposite direction to bring the pneumatic device back to the starting point. Furthermore, the relation of these two cams with respect to the cam 33 is such that the sleeve starts to descend at the same time that the cam 33 begins to swing the feed roll 9 away from its coöperating feed roll, and the forward angular movement of a pneumatic device being completed somewhat before the cam 33 returns the swinging frame back to the feeding position; thus permitting the pick-up device to be brought into operation as soon as the counter-shaft starts and permitting it to deliver the front end of a strip to the main feed rolls before the latter have been brought together.

The details of the pneumatic pick-up device are best illustrated in Figs. 30 to 37. The outer end of the arm 46ª is provided with a cylindrical screw-threaded opening 46ᶜ extending therethrough. Screwed into this opening from the top is a cylindrical shell 56 which may be conveniently closed at the upper end by means of a cap 57 screw-threaded thereon. Extending down through the cap and slidable therein is a tube 58 on the lower end of which is a piston 59 having a port 60 leading from the underside thereof into the interior of the tube. The upper end of the tube is open. A clamp 61 is secured about the upper end of the tube and, by engaging with the upper side of the cap 57, prevents the tube from dropping out. The port in the piston is controlled by a valve 62 on the lower end of an elongated rod 63 which extends throughout the length of the tube and projects beyond the top thereof. The clamp 61 is provided with an extension or bracket 61ª which forms a bearing and guide for the valve stem. The valve stem is smaller in diameter than the interior of the tube and therefore there is free communication between the space on the underside of the piston and the atmosphere when the valve is open. Surrounding the lower end of the tube and its piston is a cylinder 64 having a lower chamber 64ª in which the piston is adapted to slide and an upper reduced portion 64ᵇ slidably fitting on the tube. The parts are so proportioned that when the tube is in its lowermost position relative to the cylindrical shell or casing 56, the reduced portion 64ᵇ extends some distance into the lower end of the shell or casing, leaving an annular space between the two. On the tube within the shell or casing is a sleeve 65 whose upper end lies at a considerable distance below the cap 57 when the tube is in its lowermost position relative to the shell or casing. The sleeve may conveniently be secured upon the tube by means of screw-threads as indicated at 65ª. The exterior diameter of the sleeve 65 is less than the interior diameter of the casing or shell 56, and the interior diameter of the sleeve is such as to make it a sliding fit upon the reduced portion 64ᵇ of the cylinder member 64. The screw-threads 65ª are preferably formed in a head in the upper end of the sleeve so as to provide an internal annular shoulder at the top of the sleeve. The lower end of the sleeve is enlarged as indicated at 65ᵇ so as to make a sliding fit within the interior of the main casing. Within the sleeve and surrounding the tube is a long coiled spring 66 which rests at its lower end upon the upper end of the member 64 and engages at its upper end with the annular shoulder at the top of the sleeve. On the outside of the sleeve is another longer and more powerful coiled spring 67 which engages at its lower end with the enlargement 65ᵇ on the sleeve and at its upper end with the interior of the cap 57. The lower chamber in the member 64 is open at the bottom and is surrounded by a yieldable annular flange 64$^c$ which may conveniently take the form of a ring of soft rubber clamped between the member 64 and a nut 64$^d$ screwed thereon, a portion of the ring projecting outwardly and downwardly so that when the member 64 is pressed against a flat surface, the rubber ring will be the first to engage with the surface and make a tight joint between the member 64 and the surface with which it engages. On the upper end of the valve stem is a head or button 63$^a$, preferably rounded on its underside.

On the frame of the machine, above the main feed rolls, is a forked tripping plate 68, best shown in Figs. 3, 7, and 33, this plate being just high enough to engage with the underside of the head or button on the valve stem when the lifting device is swung forward while occupying its raised position; the upper surface of the plate being inclined so that as the head or button moves forwardly thereon, it and the valve stem by which it is carried, are lifted, thus raising the valve and uncovering the port 60 in the piston 59.

The operation of the pneumatic delivering device will now be understood. Normally, when the counter-shaft is stationary, the parts occupy the positions indicated in Figs. 3 and 7, a line drawn at right angles to the longitudinal axis of the machine through the axis of the shaft 44 intersecting the longitudinal axis of the machine at equal distances from the tripping plate 68 and the pneumatic lifting device on the end of the arm 46$^a$. When the counter-shaft is set in operation, the first thing which occurs is the lowering of the member 46 so as to bring the pneumatic lifting device down upon the top of the pile of strips 4; Fig. 30 showing the condition of the parts of the lifting device just after the latter has engaged with the top of the pile, the piston 59 being in the upper portion of the cylindrical chamber 64$^a$. As the downward movement of the member 46 continues, the tension of the springs 66 and 67 is overcome, so that the piston descends into the bottom of its cylindrical chamber, the pressure being transmitted through the two coiled springs until the condition illustrated in Fig. 31 is reached. This downward movement of the piston has driven the air out from beneath it so that the piston with the underside of the cylinder member 64 forms substantially a continuous surface which engages with the upper strip, 4$^a$, of the pile. It will be seen that the sleeve 65 descends until it rests upon the enlarged portion of the cylinder member 64, at which point its downward movement is arrested. However, the main shell or casing 56 is free to continue its downward movement subject to the tension of the springs, so that it is unnecessary to adjust the parts so accurately that the downward movement of the carrying member 46 must always be arrested at a predetermined point. In other words, the height of the pile may vary within reasonable limits and there may be more or less lost motion in the mechanism due to wear, without interfering with the successful operation of the pneumatic device. The second step in the operation is the lifting of the main supporting member 46, this resulting first in a partial lifting of the main shell or casing 56 as indicated in Fig. 32, the members 56 and 65 thereafter moving up together until the condition illustrated in Fig. 30 is again reached. As the member 65 rises it carries with it the tube 58 and the piston, thus producing a partial vacuum in the cylindrical chamber below the piston and causing the member 64 to be clamped tightly against the uppermost strip by atmospheric pressure. During the further upward travel of the main supporting sleeve 46, the front end of the top strip is raised so as to be brought opposite the space between the main feed rolls which are at this time separated from each other. The cam 45 now comes into play and swings the vertical shaft 44 so as to carry the pneumatic lifting device in the direction of the feed rolls. This forward movement continues until the free end of the raised strip is passed between the rolls, the upper end of the valve stem entering between the prongs of the tripping plate 68 and the head or button riding upwardly thereon so as to lift the valve stem and the valve which it carries; the condition being now that illustrated in Fig. 33. As soon as the valve is lifted, communication is established between the cylindrical chamber 64$^a$ on the underside of the piston 59 and the surrounding atmosphere, the vacuum being broken; and consequently the strip is released from the lifting device. The main feed rolls now begin to close together and the cam 45 returns the shaft 44 to the starting point, the valve dropping down upon its seat again as soon as the head on the valve stem leaves the tripping plate; so that the parts are again in the condition shown in Figs. 3 and 7, ready to pick up another strip after the rear end of the strip which has just been delivered reaches the main feed rolls.

As the strips are removed from the top of the pile on the table 3, the table is raised so as to maintain the top of the pile at a substantially constant level, this being preferably accomplished automatically during the operation of the machine. It is also desirable to provide means for raising and lowering the table manually so as to lower it when additions are made to the pile and give it the proper initial adjustment.

The table itself is best illustrated in Figs. 1, 2, 8 and 9. Referring to these figures 70 and 71 are two pedestals on top of each of which is a horizontal worm 72, each worm having an elongated hub 73 extending down and revoluble in the pedestal so as to produce a firm bearing. Passing vertically through each worm is a coarse screw 74, relative axial movement between each screw and the worm in which it is mounted being produced by a relative angular movement between the same. The upper end of each of the screws carries and is fixed in any suitable way to the table 3. On one side of the table I provide upwardly extending arms or abutments 3ª whose inner faces are at right angles to the upper surface of the table. The abutments serve to engage one edge of each of the strips on the table and thus permit the pile to be built up evenly by simply placing one strip on top of the other and pushing it laterally until it engages with the abutments. The table is preferably provided with a series of transverse rollers 75 which project slightly above the upper surface thereof and thus form the immediate supporting surfaces for the strips. This permits the entire pile of strips to be easily adjusted longitudinally of the table. At one side of the table and supported upon the pedestals is a longitudinal shaft 77 provided with worm wheels 78 meshing with the worms 72. On one end of the shaft is a handle or crank 79 by which it may be turned so as manually to rotate the shaft and thus raise or lower the table. I prefer to mount the crank in such a way that it may be permitted to hang idle during the time the shaft is operated automatically. This may conveniently be accomplished by making the crank loose on the shaft so that it can slide back and forth and providing the shaft with a radially projecting pin 80 which is adapted to enter an open-ended slot 81 in the hub of the crank. When the pin is in the slot, the crank and the shaft are compelled to rotate together; but when the crank is drawn longitudinally so as to disengage the pin from the slot, the shaft is free to rotate independently of the crank.

The front end of the shaft 77 extends beyond the rear end of the main counter-shaft 32 and I have provided mechanism between these two shafts so that whenever the countershaft is operated it turns the shaft 77 and thus raises the table a distance equal to the thickness of the strip which has been taken from the top of the pile and delivered to the feed rolls. This mechanism is best shown in Figs. 3 and 38 to 44. Referring to these figures, it will be seen that on the rear end of the main counter-shaft is a disk 83 and just behind the plane of the disk on the shaft 77 is a ratchet wheel 84. On the shaft 77 in proximity to the ratchet wheel is an adjustable pawl mechanism for engaging with the ratchet wheel and turning the shaft 77 step by step. The ratchet wheel may be secured to its shaft in any suitable manner as, for example, by means of a key 84ª. On one side of the ratchet wheel is a frame 85 loosely journaled at one end on the shaft 77 so as to be free to swing thereon. In the arrangement shown, this frame has two separated parallel guides 86 which lie parallel to a radius drawn midway between them from the supporting shaft. Between these guides is mounted a block or cross head 87 into which extends the inner end of a screw 88 revolubly supported in the outer end of the frame and lying between and parallel with the guides. The screw is held against axial movement relative to the frame by means of shoulders 89 and 90 which engage with the opposite sides of a transverse member 91 on the frame. The screw may also be provided with a head 92 on its outer end by which it may be turned. Furthermore, a set screw 93, or other suitable means, may be provided for locking the screw against rotation and thus holding the block or cross head in any desired position. The cross head is provided with a laterally extending trunnion 94 lying parallel with the shaft 77 and with the counter-shaft 32. On the member 94 is journaled one end of an arm 95 whose other end is pivotally connected to the disk 83 on the end of the counter-shaft at one side of the axis of the shaft as indicated at 96. By this arrangement, when the counter-shaft turns, it causes the swinging frame on the shaft 77 to rock back and forth.

On the frame 85 is a pawl, preferably a plurality of pawls, for engaging with the ratchet wheel 84 and turning the same when the frame 85 is oscillated. In the arrangement shown, there are three pawls 97 each of which is pivoted at one end to the supporting frame as indicated at 98. I prefer so to space the pawls that the distance between them is not an exact multiple of the angular length of one of the teeth on the ratchet wheel; thus securing the effect of a single pawl and a ratchet wheel having three times as many teeth as in the wheel illustrated, and making it possible to obtain small angular movements without having the teeth too fine or the ratchet wheel too large. Each pawl is provided with a spring 99 one end of which engages with the pawl and the other end with a projection on the supporting frame; the projections being conveniently in the form of little posts 100 which are driven into holes in the frame. Each pawl is also provided at a point removed from its pivotal axis with a laterally projecting finger 101 which extends through a slot 102 in the supporting frame. The frame is provided with a projecting hub 103 on one side and on this hub is revolubly mounted a member 104 having three cams 105 each of which extends into proximity to one of the pins 101 on the pawls. The parts are so proportioned that in one position of the cam member, the pins 101 are free therefrom and therefore the springs hold the pawls against the periphery of the ratchet wheel, while in another position of the member 104 the cams engage with the pins 101 and hold the pawls away from the ratchet wheel against the tension of the springs. The member 104 is provided with a spring plunger 106 which is adapted to engage in either of two radial openings 107 and 108 in the hub 103. When the plunger is in the opening 108, as indicated in Fig. 38, the cam member 104 is held in its idle position and the pawls are in engagement with the ratchet wheel. On the other hand, when the spring plunger is dropped into the hole 107, as indicated in Figs. 39 and 42, the cam member is held in the position in which it renders the pawls inoperative. Consequently, the cam member may readily be shifted from one position to another and be locked positively in either position. To make the operation of adjusting the cam member as simple as possible, I have provided it with a short slot 109 into which projects a pin 110 extending radially from the hub 103. The pin and slot limit the movement of the cam member on the hub of the swinging frame and, when the pin is at one end of the slot the spring plunger is in position to drop into one of the openings in the hub, while when the pin is in the opposite end of the slot the spring plunger registers with the other opening.

When it is desired to adjust the table manually, the cam member is swung into the position indicated in Fig. 39, carrying the pawls away from the ratchet wheel and permitting the shaft 77 to move independently of the counter-shaft. After the table has been adjusted and the machine set in operation, the cam member is swung into its idle position indicated in Fig. 38, allowing the pawls to rise against the ratchet wheel. As I have heretofore explained, the counter-shaft makes one revolution for each strip which is fed through the machine and consequently the pawl-supporting frame will be swung through a predetermined angle and back again whenever a strip is taken from the top of the pile on the table, the movement of the pawl frame in the counter-clockwise direction, as viewed in Fig. 38, turning the shaft 77 through a predetermined angle and therefore raising the table a predetermined distance. On the return movement of the pawl frame, the pawls ride idly over the ratchet teeth. By adjusting the screw 88, so as to vary the distance between the point of connection between the end of the actuating arm 95 and the axis of the shaft 77, the angle through which the pawl frame is swung during each revolution of the counter-shaft may be varied, thus varying the angle through which the shaft 77 is turned and the distance through which the table is raised. This permits the steps through which the table is raised to be accurately proportioned to suit the thicknesses of the strips which are being fed; the stock from which some strips are made being heavier than that from which others are made.

The combined slitting and feed rolls Z, in the arrangement shown, are mounted on a suitable frame, 120, in position to receive the strips from the table. These rolls are driven in any suitable way so that they tend to move the strips received by them at a lower speed than that at which the strips approach. In the arrangement shown, the rolls Z are driven by a belt, 121, passing over a pulley, 122, carried by the main driving shaft, 16, and over a pulley, 123, operatively connected with the slitting rolls Z. The pulleys 21 and 22 are smaller in diameter than the pulleys 17 and 18 while the pulleys 122 and 123 are illustrated as being of the same diameter. Consequently the rolls which deliver the strips to the slitting rolls tend to feed the strips faster than the speed at which they pass through the slitting rolls.

The operation of the various groups of mechanisms have been explained in detail in connection with the description of the construction and arrangement of the various parts and groups of parts. It will now be seen that I have provided simple and efficient mechanism for automatically delivering strips to a metal-working machine at such a rate and in such a manner that each strip enters the machine immediately behind another, thus producing the effect of one continuous strip, wasting no time by reason of a gap between the adjacent ends of two strips, and causing the machine to work smoothly. It will also be seen that I have provided means for positively preventing the strips from overlapping, even though a strip be moving much more rapidly than the one in advance thereof at the time the two come in contact with each other. It will also be seen that the feeding or delivery of the strips to the machine in which they are worked up is adapted for any desired speed, the parts being so coördinated that the feeding or delivery mechanism adjusts itself automatically to suit the speed of the machine which it is supplying with strips, this being accomplished by simply connecting the main shaft of the feeding machine to some movable part or shaft on the machine which it supplies. The only manual labor required in connection with my machine is that necessary to replenish the supply of strips on the table from which they are taken, this being a simple operation so that a single workman can take care of a large number of machines or, may do other work in addition to that of looking after one or more of my machines.

While I have illustrated and described in detail only a single machine embodying preferred forms of the several novel features of my invention, the machine being one particularly adapted for feeding strips into a machine for making expanded metal lath, I do not desire to be limited to the particular structural details thus illustrated and described or to a machine in which all of the various features are combined together, or to the particular field of use which I have explained, but intend to cover all forms and arrangements which fall within the terms employed in the definitions of my invention constituting the appended claims.

I claim:

1. In combination, rolls for receiving metal strips, feeding mechanism for delivering strips to said rolls, said feeding mechanism including means for producing at the rear end only of each strip a vertical shoulder adapted to be engaged by the front edge of a following strip.

2. In combination, a receiver for metal strips, mechanism for delivering strips to said receiver, said mechanism including means for producing a vertical shoulder at the rear edge of each strip and said mechanism being constructed and arranged to feed each strip faster than it passes through said receiver so as to cause the front edge of each strip to be fed into engagement with the shoulder at the rear end of the preceding strip, and means for preventing the front end of a strip from rising above or falling below the shoulder on the strip in advance.

3. In combination, a receiver for strips, feed rolls for feeding strips to said receiver, mechanism between said feed rolls and said receiver for producing a vertical shoulder in said strips, and means controlled by a strip for opening said feed rolls and causing said mechanism to act upon each strip when the rear end thereof reaches said mechanism.

4. In combination, rolls for receiving and feeding strips, a table for supporting a strip and guiding it into said rolls, means for delivering strips to said table and feeding them along the same toward said rolls, and means adjacent to the end of the table nearest the rolls for slightly tilting the front end of each strip so as to bring the front edge at an angle to the plane of the top of the table.

5. In combination, a receiver for metal strips, a table for supporting and guiding strips into said receiver, mechanism for delivering strips upon the table and feeding them toward said receiver, said mechanism including means for producing a vertical shoulder at the rear end of each strip, and means on the table for preventing the front end of a strip from rising above or dropping below the shoulder on the rear end of the strip in advance.

6. In combination, a receiver for strips, a table for supporting and guiding strips into the receiver, mechanism for delivering strips to said table one at a time and feeding them faster than the speed at which they pass through said receiver, said mechanism including means for producing a vertical shoulder at the rear end of each strip, and means on the table for preventing the front end of a strip from rising above or dropping below the shoulder on the strip in advance, said mechanism being constructed and arranged to permit each strip to move at the same speed as the strip in advance thereof after the two strips have been brought in contact with each other.

7. In combination, a receiver for strips, a table for supporting strips and guiding them into said receiver, mechanism for delivering strips one at a time to said table and feeding them along the table, said mechanism being constructed and arranged to feed the strips at a speed greater than that at which they pass through said receiver, means on the table for preventing the front end of a strip from overlapping the rear end of the strip in advance, and said mechanism being constructed and arranged to permit each strip to move at the same speed as the strip in advance when it engages therewith.

8. In combination, a receiver for strips, a table for supporting strips and guiding them into said receiver, mechanism for delivering strips one at a time to said table and feeding them along the table, said mechanism being constructed and arranged to feed the strips at a speed greater than that at which they pass through said receiver, means on the table for preventing the front end of a strip from overlapping the rear end of the strip in advance, said mechanism being constructed and arranged to permit each strip to move at the same speed as the strip in advance when it engages therewith, and means between said receiver and the adjacent end of the table for tilting the advance end of each sheet slightly so as to prevent it from overlapping the sheet in advance at a point between the end of the table and the machine.

9. In combination, a receiver for metal strips, a table for supporting strips and guiding them into the receiver, mechanism for delivering strips one at a time to the table and feeding them along the same toward said receiver, means on the table for preventing the ends of the strips from overlapping each other, and means between said receiver and the adjacent end of the table for slightly tilting the front end of each strip about a longitudinal axis so as to prevent it from passing the rear end of a strip going through the receiver.

10. In combination, a receiver for metal strips, a table for supporting strips and guiding them into the receiver, mechanism for delivering strips one at a time to the table and feeding them along the same toward said receiver, means on the table for preventing the ends of the strips from overlapping each other, yieldable fingers projecting beyond the end of the table adjacent to said machine, one of said fingers being adapted to engage with the underside of the strip at one side of the longitudinal center and the other finger being adapted to engage with the upper side of the strip on the opposite side of the longitudinal center, and means associated with said fingers for pressing them against a strip with sufficient force to tilt the strip slightly about a longitudinal axis.

11. In combination, a table for supporting and guiding strips, mechanism for delivering strips to said table one at a time and feeding them along the same, said mechanism including means for producing a vertical shoulder at the extreme rear end of each strip, said table having a longitudinal groove for receiving said shoulder and having portions for engaging with the upper side and the underside of each strip so as to prevent the advance end of a strip from rising above or falling below the shoulder on the strip in advance.

12. In combination, a table for supporting and guiding strips, a cover arranged above the table at a distance slightly greater than the thickness of a strip, mechanism for delivering strips one at a time between the table and the cover and feeding them along the table, said mechanism including means for forming longitudinal corrugations in the rear end of each strip so as to make the effective thickness of the rear end of each strip greater than the distance between the cover and the table, and there being longitudinal grooves in the cover for receiving said corrugations.

13. In combination, a table for supporting and guiding strips, a cover arranged above the table at a distance slightly greater than the thickness of a strip, mechanism for corrugating the rear ends of strips and delivering strips one at a time between the table and the cover and feeding them along the table, and there being longitudinal grooves in the table for receiving the corrugations.

14. In combination, a table for supporting and guiding strips, a cover arranged above the table at a distance slightly greater than the thickness of a strip, mechanism for corrugating the rear ends of strips and delivering strips one at a time between the table and the cover and feeding them along the table, and said table and said cover being corrugated longitudinally to receive the corrugations on the strips.

15. In combination, a support for a pile of strips, feeding mechanism at one end of said support, delivery mechanism for removing a strip from the top of a pile on said support and introducing its end into said feeding mechanism, lifting mechanism for raising said support step by step through distances equal approximately to the thickness of a strip, and means controlled by a strip in said feeding mechanism for actuating said delivery mechanism and said lifting mechanism.

16. In combination, feeding mechanism, a support adjacent to said mechanism for a pile of strips, delivery mechanism for removing the uppermost strip from the pile and delivering it to said feeding mechanism, lifting mechanism for automatically raising said support through a distance approximately equal to the thickness of a strip when a strip is removed from the pile, and means controlled by a strip passing through said feeding mechanism for actuating said delivery mechanism and said lifting mechanism.

17. In combination, feeding mechanism, delivery mechanism for removing the uppermost strip from an adjacent pile and delivering it to said feeding mechanism, lifting mechanism for raising said pile through a distance approximately equal to the thickness of a strip when a strip is removed from the pile, a member for driving said delivery mechanism and said lifting mechanism, a power device, a clutch between said member and said power device, and means controlled by a strip passing through said feeding mechanism for actuating said clutch.

18. In combination, feeding mechanism, a support adjacent to said mechanism for a pile of strips, delivery mechanism for removing the uppermost strip from the pile and delivering it to said feeding mechanism, lifting mechanism for said support, a shaft for actuating said delivery mechanism and said lifting mechanism, a power device for driving said shaft, a clutch between said shaft and said power device, and means controlled by a strip passing through said feeding mechanism for actuating said clutch.

19. In combination, a receiver for strips, feed rolls for feeding a strip toward said receiver, rolls arranged between said receiver and the feed rolls and adapted to increase the effective thickness of the rear end of a strip passing therethrough, and means controlled by a strip for opening the feed rolls and closing the other rolls upon the strip.

20. In combination, feed rolls, rolls lying in advance of the feed rolls for increasing the effective thickness of a strip passing therethrough, and means controlled by a strip passing through the feed rolls for opening the feed rolls and closing the other rolls upon the rear end of the strip.

21. In combination, feed rolls, rolls lying in advance of the feed rolls for producing a vertical offset in a strip passing therethrough, means controlled by a strip passing through the feed rolls for opening the feed rolls and closing the other rolls upon the rear end of the strip, and means for drawing the rear end of a strip through the latter rolls.

22. In combination, a set of feed rolls, a set of rolls in advance of the feed rolls for producing a vertical offset in the rear end of a strip passing therethrough, a movable frame for supporting one roll of each set, said frame having one position in which one set of rolls is closed and the other set open and another position in which the latter set of rolls is closed and the first set is open, and means controlled by a strip passing through the rolls for moving said frame from one position to the other.

23. In combination, a set of feed rolls, a set of rolls for producing a vertical offset in a strip passing therethrough, an oscillatory frame on which is mounted one roll of each set, said frame having two operative positions in each of which one of the sets of rolls is open and the other closed, and means for oscillating said frame from one position to the other.

24. In combination, a set of feed rolls, a set of rolls for producing a vertical offset in a strip passing therethrough, an oscillatory frame on which is mounted one roll of each set, said frame having two operative positions in each of which one of the sets of rolls is open and the other closed, and means controlled by a strip passing through the rolls for oscillating said frame from one position to the other.

25. In combination, a set of feed rolls, a set of rolls for producing a vertical offset in a strip passing therethrough, an oscillatory frame carrying one roll of each set, said frame being so constructed and arranged that by oscillating it either set of rolls may be opened and the other set closed, a cam for oscillating said frame, a power device for driving said cam, a clutch between said power device and said cam, and means controlled by a strip for actuating said clutch.

26. In combination, a set of feed rolls, a set of rolls for producing a vertical offset in a strip passing therethrough, an oscillatory frame carrying one roll of each set, said frame being so constructed and arranged that by oscillating it either set of rolls may be opened and the other set closed, a cam for oscillating said frame, a power device for driving said cam, a clutch between said power device and said cam, means controlled by a strip passing through said rolls for throwing said clutch into operation, and means on the cam for throwing the clutch out of operation.

27. In combination, feed rolls, means for opening and closing said rolls, power-actuating means including a clutch for operating the aforesaid means, a spring tending normally to throw in the clutch, and a restraining device for the spring including a movable part adapted to rest upon and be supported by a strip passing through said rolls.

28. In combination, a feeding mechanism for strips, a two-position controller for governing the operation of said mechanism, a spring tending to hold said controller in one of its positions, restraining mechanism for holding said controller in its other position against the tension of said spring; said restraining mechanism including a part adapted to engage with the controller and a part adapted to rest upon and be supported by a strip in the feeding mechanism, and a weak spring tending to hold the latter part in the position which it occupies when resting upon a strip.

29. In combination, feeding mechanism for strips, a two-position clutch member, a spring tending to hold said clutch member in one of its positions, a restraining mechanism for holding said clutch member in its other position against the tension of the spring, said restraining mechanism including a part adapted to engage the clutch member and a part adapted to rest upon and be supported by a strip in the feeding mechanism, and a weak spring tending to hold the latter part in the position which it occupies when resting upon a strip.

30. In combination, a receiver for metal strips, a table for supporting and guiding strips into said receiver, mechanism for delivering strips upon the table one at a time and feeding them toward said receiver, said mechanism including means for producing at one end of each strip a vertical offset which is adapted to engage with the edge of an adjacent strip so as to prevent one strip from over-lapping the other, and means on the table for preventing a relative vertical movement between consecutive strips sufficient to permit one strip to rise above or drop below the offset on the adjacent strip.

31. In combination, a receiver for metal strips, mechanism for feeding strips one at a time to said receiver, and means for slightly tilting the front end of each strip about a longitudinal axis just before it reaches said receiver so as to prevent the adjacent ends of the strips from overlapping in the receiver.

32. In combination, a receiver for metal strips, mechanism for feeding strips one at a time into said receiver, and means for slightly tilting one end of each strip about a longitudinal axis so as to prevent consecutive strips from overlapping each other at their adjacent ends.

33. In combination, a table for supporting and guiding strips, mechanism for delivering strips to said table one at a time and feeding them along the same, said mechanism including means for producing a vertical offset at one end of each strip, said table having a longitudinal groove for receiving said offset, and members on the table for engaging with the upper sides of the strips so as to prevent the contacting ends of two strips from moving relatively to each other in the vertical direction a sufficient distance to permit one strip to pass above or fall below the offset on the other strip.

34. In combination, feeding mechanism for strips, a support for a pile of strips adjacent to said mechanism, a suction device, and means controlled by a strip in said feeding mechanism for lowering said suction device upon the uppermost strip of the pile and then moving said suction device so as to carry the end of that strip into the feeding mechanism.

35. In combination, feeding mechanism for strips, a support for a pile of strips adjacent to said mechanism, a suction device, means controlled by a strip in said feeding mechanism for lowering said suction device upon the uppermost strip of the pile and then moving said suction device so as to carry the end of that strip into the feeding mechanism, and means for destroying the suction of said device when it is in the position to deliver the end of the strip to said feeding mechanism so as to release the strip from the suction device.

36. In combination, a support for a pile of strips, a vertical shaft at one side of said support, a sleeve mounted on the shaft so as to be movable lengthwise thereof and held against angular movement thereon, a suction device carried by said sleeve and extending over the top of said pile, means for lowering said sleeve so as to bring said suction device upon the uppermost strip of the pile to grip the same, and means for oscillating said shaft so as to cause said device to feed the strip along the pile.

37. In combination, a support for a pile of strips, a vertical shaft at one side of said support, a sleeve mounted on the shaft so as to be movable lengthwise thereof and held against angular movement thereon, a suction device carried by said sleeve and extending over the top of said pile, and then raising the device so as to lift the uppermost strip, and means for oscillating said shaft so as to carry the device and the strip carried thereby along the pile.

38. In combination, a support for a pile of strips, a vertical shaft at one side of said support, a sleeve mounted on the shaft so as to be movable lengthwise thereof and held against angular movement thereon, a suction device carried by said sleeve and extending over the top of said pile, means for lowering said sleeve so as to bring said suction device upon the uppermost strip of the pile to grip the same, means for oscillating said shaft so as to cause said device to feed the strip along the pile, and means for destroying the partial vacuum in said device at a predetermined point in the oscillation of said shaft.

39. In combination, a support for a pile of strips, a vertical shaft at one side of said support, a sleeve mounted on the shaft so as to be movable lengthwise thereof and held against angular movement thereon, a suction device carried by said sleeve and extending over the top of said pile and then raising the device so as to lift the uppermost strip, means for oscillating said shaft so as to carry the device and the strip carried thereby along the pile, and means for destroying the partial vacuum in said device at a predetermined point in the oscillation of the shaft so as to cause said device to release the strip.

40. In combination, a support for a pile of strips, a vertical shaft at one side of said support, a sleeve slidably mounted on the shaft, means for detachably locking the sleeve against rotation on the shaft, a pickup device carried by the sleeve and projecting over the top of said pile, means for lowering said sleeve so as to cause said device to take hold of the uppermost strip on the pile, and means for oscillating said shaft so as to carry said device and said strip along the pile.

41. In combination, a support for a pile of strips, a vertical shaft at one side of said support, a sleeve slidably mounted on the shaft, means for detachably locking the sleeve against rotation on the shaft, a pickup device carried by the sleeve and projecting over the top of said pile, means for lowering said sleeve so as to cause said device to take hold of the uppermost strip on the pile, means for oscillating said shaft so as to carry said device and said strip along the pile, and means for causing said pick-up device to release the strip at a predetermined point in the oscillation of the shaft.

42. In combination, rolls for receiving strips, mechanism for feeding strips to said rolls, and means for slightly twisting the front end of each strip about a longitudinal axis as the front end of the strip approaches said rolls, thereby preventing the front end of one strip from overriding the rear end of the preceding strip.

43. In combination, feeding mechanism for strips, a two-position clutch member, a spring tending to hold said clutch member in one of its positions, a restraining mechanism for holding said clutch member in its other position against the tension of said spring, said restraining mechanism including a part adapted to engage the clutch member and a part adapted to rest upon and be supported by a strip in the feeding mechanism, and a weak spring acting on said latter part and moving it when free so to do into the position which it occupies when resting on the strip.

44. In combination, feeding mechanism for strips, a two-position clutch member, a spring tending to hold said clutch member in one of its positions, a restraining member for holding said clutch in its other position against the tension of the spring, said restraining mechanism including a part adapted to be held by a strip in the feeding position against the tension of the aforesaid spring, and a weak spring tending to hold the latter part in the position which it occupies when resting on a strip.

45. In combination, feeding mechanism for strips, a two-position clutch member, a spring tending to hold said clutch member in one of its positions, a device adapted to rest on and be supported by a strip in the feeding mechanism, and means between said clutch member and said device for overcoming the thrust of the spring and holding said clutch member in its other position against the tension of the spring, and a weak spring tending to hold said device in the position which it occupies when resting on a strip.

In testimony whereof, I, sign this specification in the presence of two witnesses.

FRED C. AREY.

Witnesses:
WM. F. FREUDEMEISH,
RUBY V. BRYDGES.